US011950286B2

(12) United States Patent
Raissinia et al.

(10) Patent No.: US 11,950,286 B2
(45) Date of Patent: Apr. 2, 2024

(54) UPLINK MULTIPLE ACCESS SOUNDING SEQUENCES

(71) Applicant: QUALCOMM Incorporated, San Diego, CA (US)

(72) Inventors: Alireza Raissinia, Monte Sereno, CA (US); Xiaoxin Zhang, Sunnyvale, CA (US); Stephen Jay Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/707,772

(22) Filed: Mar. 29, 2022

(65) Prior Publication Data
US 2023/0319882 A1    Oct. 5, 2023

(51) Int. Cl.
*H04W 74/0816* (2024.01)
*H04W 72/044* (2023.01)
*H04W 72/121* (2023.01)
*H04W 74/06* (2009.01)

(52) U.S. Cl.
CPC ..... *H04W 74/0816* (2013.01); *H04W 72/044* (2013.01); *H04W 72/121* (2013.01); *H04W 74/06* (2013.01)

(58) Field of Classification Search
CPC ... H04L 5/0037; H04L 5/0051; H04L 5/0057; H04L 5/0094; H04W 72/044; H04W 72/121; H04W 74/06; H04W 74/0816
See application file for complete search history.

(56) References Cited

U.S. PATENT DOCUMENTS

| | | | | |
|---|---|---|---|---|
| 10,050,762 | B2 * | 8/2018 | Mack | H04L 5/006 |
| 10,750,395 | B2 * | 8/2020 | Zhou | H04B 7/0632 |
| 2016/0330732 | A1 * | 11/2016 | Moon | H04B 7/0639 |
| 2017/0289933 | A1 * | 10/2017 | Segev | H04B 17/27 |
| 2018/0263043 | A1 * | 9/2018 | Zhou | H04W 72/12 |
| 2018/0343580 | A1 * | 11/2018 | Xiang | H04W 24/10 |
| 2018/0359761 | A1 * | 12/2018 | Chun | H04W 72/21 |
| 2021/0385779 | A1 * | 12/2021 | Oteri | H04W 60/04 |

OTHER PUBLICATIONS

International Search Report and Written Opinion—PCT/US2023/015732—ISA/EPO—dated Jun. 20, 2023.

* cited by examiner

*Primary Examiner* — Kashif Siddiqui
(74) *Attorney, Agent, or Firm* — Holland & Hart LLP/Qualcomm

(57) ABSTRACT

Methods, systems, and devices for wireless communication are described. A first wireless communications device may transmit, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The first wireless communications device may perform channel sensing measurements on the second message received from each of the one or more second wireless communications devices. The first wireless communications device may estimate the channel based on the channel sensing measurements performed on the respective second messages received on the respective frequency-based resource units.

27 Claims, 17 Drawing Sheets

First Message 220

Second Message 225

UPLINK MULTIPLE ACCESS SOUNDING SEQUENCES

BACKGROUND

The following relates to wireless communication, including uplink multiple access sounding sequences.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

In some wireless communications systems, wireless communications devices may perform channel sensing to sense channel conditions in an environment in which the wireless communications devices operate. However, such approaches may be improved.

SUMMARY

The described techniques relate to improved methods, systems, devices, or apparatuses that support uplink multiple access sounding sequences. For example, a first wireless communications device may transmit, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The first wireless communications device may perform channel sensing measurements on the second message received from each of the one or more second wireless communications devices, respective second messages received on the respective frequency-based resource units. The first wireless communications device may estimate the channel based on the channel sensing measurements performed on the respective second messages received on the respective frequency-based resource units.

A method for wireless communication at a first wireless communications device is described. The method may include transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel, performing channel sensing measurements on the second message received from each of the one or more second wireless communications devices, respective second messages received on the respective frequency-based resource units, and estimating the channel based on the channel sensing measurements performed on the respective second messages received on the respective frequency-based resource units.

An apparatus for wireless communication at a first wireless communications device is described. The apparatus may include a processor, memory coupled with the processor, and instructions stored in the memory. The instructions may be executable by the processor to cause the apparatus to transmit, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel, perform channel sensing measurements on the second message received from each of the one or more second wireless communications devices, respective second messages received on the respective frequency-based resource units, and estimate the channel based on the channel sensing measurements performed on the respective second messages received on the respective frequency-based resource units.

Another apparatus for wireless communication at a first wireless communications device is described. The apparatus may include means for transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel, means for performing channel sensing measurements on the second message received from each of the one or more second wireless communications devices, respective second messages received on the respective frequency-based resource units, and means for estimating the channel based on the channel sensing measurements performed on the respective second messages received on the respective frequency-based resource units.

A non-transitory computer-readable medium storing code for wireless communication at a first wireless communications device is described. The code may include instructions executable by a processor to transmit, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel, perform channel sensing measurements on the second message received from each of the one or more second wireless communications devices, respective second messages received on the respective frequency-based resource units, and estimate the channel based on the channel sensing measurements performed on the respective second messages received on the respective frequency-based resource units.

In some examples of the method, apparatuses, and non-transitory computer-readable medium described herein, transmitting the first message may include operations, features, means, or instructions for transmitting a polling trigger frame as the first message to the one or more second wireless communications devices, the polling trigger frame triggering the one or more second wireless communications devices to transmit a clear-to-send to self message as the second message on the respective frequency-based resource units.

In some examples of the method, apparatuses, and non-transitory computer-readable medium described herein, transmitting the first message may include operations, features, means, or instructions for transmitting a sounding trigger frame as the first message to the one or more second wireless communications devices, the sounding trigger frame triggering the one or more second wireless communications devices to transmit an uplink null data packet as the second message on the respective frequency-based resource units.

In some examples of the method, apparatuses, and non-transitory computer-readable medium described herein, transmitting the first message may include operations, features, means, or instructions for transmitting a reporting trigger frame as the first message to the one or more second wireless communications devices, the reporting trigger frame triggering the one or more second wireless communications devices to transmit an uplink report as the second message on the respective frequency-based resource units.

Some examples of the method, apparatuses, and non-transitory computer-readable medium described herein may further include operations, features, means, or instructions for performing the channel sensing measurements based on a preamble of the second message.

In some examples of the method, apparatuses, and non-transitory computer-readable medium described herein, performing the channel sensing measurements on the second message received from each of the one or more second wireless communications devices may include operations, features, means, or instructions for performing the channel sensing measurements at least one of a preamble portion of the clear-to-send to self message on the respective frequency-based resource units, an uplink null data packet on the respective frequency-based resource units, or a preamble portion of an uplink report on the respective frequency-based resource units.

In some examples of the method, apparatuses, and non-transitory computer-readable medium described herein, transmitting the first message may include operations, features, means, or instructions for transmitting multiple instances of the first message to different sets of the one or more second wireless communications devices during a single sounding sequence.

In some examples of the method, apparatuses, and non-transitory computer-readable medium described herein, transmitting the multiple instances of the first message to different sets of the one or more second wireless communications devices may include operations, features, means, or instructions for transmitting a first sounding trigger frame to a first set of one or more second wireless communications devices and a second sounding trigger frame to a second set of the one or more second wireless communications devices, the first sounding trigger frame and the second sounding trigger frame triggering the one or more second wireless communications devices to transmit an uplink null data packet as the second message on the respective frequency-based resource units.

In some examples of the method, apparatuses, and non-transitory computer-readable medium described herein, transmitting the multiple instances of the first message to different sets of the one or more second wireless communications devices may include operations, features, means, or instructions for transmitting a first polling trigger frame to at least a first set of one or more second wireless communications devices and a second polling trigger frame to a second set of the one or more second wireless communications devices, the first polling trigger frame and the second polling trigger frame triggering the one or more second wireless communications devices to transmit a clear-to-send to self message as the second message on the respective frequency-based resource units.

In some examples of the method, apparatuses, and non-transitory computer-readable medium described herein, the first polling trigger frame includes a bit field with a value that indicates that the second set of the one or more second wireless communications devices may be to respond to the second polling trigger frame.

In some examples of the method, apparatuses, and non-transitory computer-readable medium described herein, transmitting the multiple instances of the first message to different sets of the one or more second wireless communications devices may include operations, features, means, or instructions for transmitting multiple instances of the first message, allocating, during transmission of a first instance of the first message, a first frequency-based resource unit for transmission of a first instance of the second message by one of the one or more second wireless communications devices, and allocating, during transmission of a second instance of the first message, a second frequency-based resource unit for transmission of a second instance of the second message by the one of the one or more second wireless communications devices.

In some examples of the method, apparatuses, and non-transitory computer-readable medium described herein, the first wireless communications device and the one or more second wireless communications devices operate in a wireless local area network.

A method for wireless communication at a second wireless communications device is described. The method may include receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel and transmitting, to the first wireless communications device, the second message on the frequency-based resource unit based on receiving the first message.

An apparatus for wireless communication at a second wireless communications device is described. The apparatus may include a processor, memory coupled with the processor, and instructions stored in the memory. The instructions may be executable by the processor to cause the apparatus to receive, from a first wireless communications device, a first message that triggers transmission of a second message by the second wireless communications device, the first message allocating to the second wireless communications device a frequency-based resource unit for transmission of the second message that spans a portion of a channel bandwidth of a channel and transmit, to the first wireless communications device, the second message on the frequency-based resource unit based on receiving the first message.

Another apparatus for wireless communication at a second wireless communications device is described. The apparatus may include means for receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel and means for transmitting, to the first wireless communications device, the second message on the frequency-based resource unit based on receiving the first message.

A non-transitory computer-readable medium storing code for wireless communication at a second wireless communications device is described. The code may include instructions executable by a processor to receive, from a first wireless communications device, a first message that triggers transmission of a second message by the second wireless communications device, the first message allocating to the second wireless communications device a frequency-based resource unit for transmission of the second message that spans a portion of a channel bandwidth of a channel and transmit, to the first wireless communications device, the second message on the frequency-based resource unit based on receiving the first message.

In some examples of the method, apparatuses, and non-transitory computer-readable medium described herein, receiving the first message may include operations, features, means, or instructions for receiving a polling trigger frame as the first message from the first wireless communications device, the polling trigger frame triggering the second wireless communications device to transmit a clear-to-send to self message as the second message on the frequency-based resource unit and transmitting the clear-to-send to self message as the second message on the frequency-based resource unit.

In some examples of the method, apparatuses, and non-transitory computer-readable medium described herein, receiving the first message may include operations, features, means, or instructions for receiving a sounding trigger frame as the first message from the first wireless communications device, the sounding trigger frame triggering the second wireless communications device to transmit an uplink null data packet as the second message on the frequency-based resource unit and transmitting the uplink null data packet as the second message on the frequency-based resource unit.

In some examples of the method, apparatuses, and non-transitory computer-readable medium described herein, receiving the first message may include operations, features, means, or instructions for receiving a reporting trigger frame as the first message from the first wireless communications device, the reporting trigger frame triggering the second wireless communications device to transmit an uplink report as the second message on the frequency-based resource unit and transmitting the uplink report as the second message on the frequency-based resource unit.

In some examples of the method, apparatuses, and non-transitory computer-readable medium described herein, channel sensing measurements may be performed by the first wireless communications device based on a preamble of the second message.

Some examples of the method, apparatuses, and non-transitory computer-readable medium described herein may further include operations, features, means, or instructions for transmitting, to the first wireless communications device, at least one of a clear-to-send to self message on the frequency-based resource unit, an uplink null data packet on the frequency-based resource unit, or an uplink report on the frequency-based resource unit and where channel sensing measurements may be performed on at least one of a preamble portion of the clear-to-send to self message, the uplink null data packet, or a preamble portion of the uplink report.

In some examples of the method, apparatuses, and non-transitory computer-readable medium described herein, receiving the first message may include operations, features, means, or instructions for receiving at least a first instance of multiple instances of the first message transmitted to different sets of one or more second wireless communications devices during a single sounding sequence.

In some examples of the method, apparatuses, and non-transitory computer-readable medium described herein, receiving at least the first instance of the multiple instances of the first message transmitted to different sets of one or more second wireless communications devices during a single sounding sequence may include operations, features, means, or instructions for receiving, from the first wireless communications device, a first sounding trigger frame transmitted to a first set of one or more second wireless communications devices, the first set including the second wireless communications device and where the first sounding trigger frame and a second sounding trigger frame transmitted to a second set of one or more second wireless communications devices trigger the one or more second wireless communications devices to transmit an uplink null data packet as the second message on respective frequency-based resource units.

In some examples of the method, apparatuses, and non-transitory computer-readable medium described herein, receiving at least the first instance of the multiple instances of the first message transmitted to different sets of one or more second wireless communications devices during a single sounding sequence may include operations, features, means, or instructions for receiving, from the first wireless communications device, a first polling trigger frame transmitted to at least a first set of one or more second wireless communications devices, the first set including the second wireless communications device and where the first polling trigger frame and a second polling trigger frame transmitted to a second set of the one or more second wireless communications devices trigger the one or more second wireless communications devices to transmit a clear-to-send to self message as the second message on respective frequency-based resource units.

In some examples of the method, apparatuses, and non-transitory computer-readable medium described herein, the first polling trigger frame includes a bit field with a value that indicates that the second set of the one or more second wireless communications devices may be to respond to the second polling trigger frame.

In some examples of the method, apparatuses, and non-transitory computer-readable medium described herein, receiving at least the first instance of the multiple instances of the first message transmitted to different sets of one or more second wireless communications devices during a single sounding sequence may include operations, features, means, or instructions for receiving the first instance of the multiple instances of the first message and a second instance of the multiple instances of the first message, receiving, during reception of the first instance, an allocation of a first frequency-based resource unit for transmission of a first instance of the second message by the second wireless communications device, and receiving, during reception of the second instance, an allocation of a second frequency-based resource unit for transmission of a second instance of the second message by the second wireless communications device.

In some examples of the method, apparatuses, and non-transitory computer-readable medium described herein, the first wireless communications device and the one or more second wireless communications devices operate in a wireless local area network.

DETAILED DESCRIPTION

Figure 1:
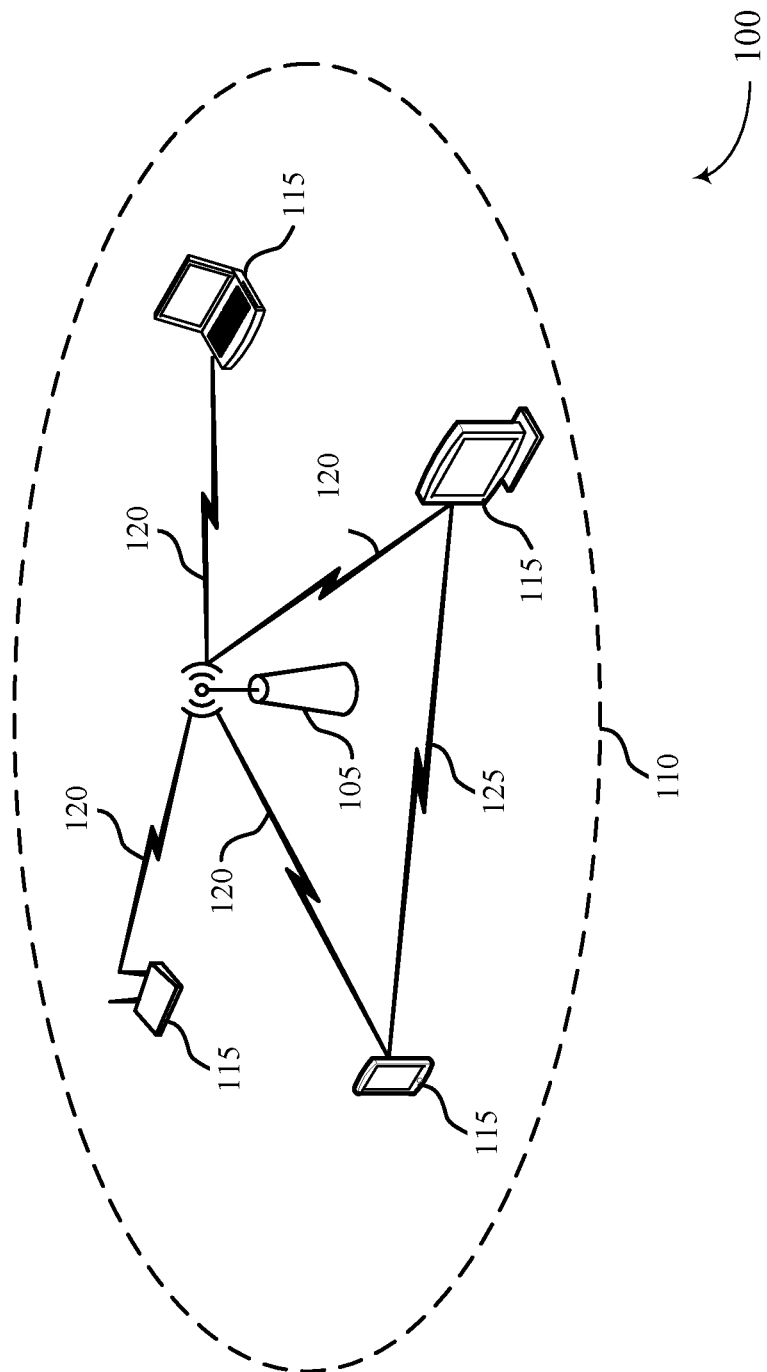
FIG. 1 illustrates an example of a wireless communication system that supports uplink multiple access sounding sequences in accordance with aspects of the present disclosure.

In a wireless communication system, devices may communicate radio frequency (RF) signals to communicate information. In addition, however, the devices in the wireless communication system may also transmit RF signals to allow other devices to sense channel conditions based on the signals. Data collected in such measurements may reflect or correspond to characteristics of objects in the environment in which the wireless communications devices operate and may be used for applications such as motion tracking or detection, location tracking, security applications, breathing rate monitoring, elderly falling detection, or other applications. Sensing accuracy improves with the number of stations (STAs) that are sounded for sensing. Sensing accuracy may also increase through the use of STAs that offer better characteristics for sensing (e.g., STAs that are closer to motion that is to be detected through sensing). Currently, the 802.11 standards allow for simultaneous sensing using different spatial beams. Thus, if an access point (AP) is capable of receiving on four different beams at a same time, the AP can sense up to four different STAs at a time. It is anticipated, however, that a home may include from 10-20 STAs that support sensing. In such scenarios with multiple STAs available for sensing, it may be difficult for some approaches to sensing to identify which STAs to use for sensing operations. Therefore, an improved way to sense more STAs at a time and select appropriate STAs for the sensing operations is desired.

To allow for sensing of additional STAs at a same time, an AP may not only trigger transmissions for sensing purposes using different spatial beams, but may also allocate different frequency-based resource units (RUs) to different STAs so that the sensing signals are transmitted by a given STA using less than all of the channel bandwidth. The AP may receive signals from different STAs using a same beam but different subsets of the channel frequency bandwidth. For example, an AP may trigger a sensing transmission from a STA. The trigger may be any one of a polling trigger frame, a sounding trigger frame, or a report trigger frame. The trigger may include an RU allocation for transmission of the responsive signal. The responsive signal (e.g., clear-to-send to self message, an uplink null data packet, or an uplink report) is transmitted by the respective STAs on different RUs. The AP receives the different signals and then is able to sense from more STAs faster. Performing sensing operations with the use frequency-based RUs (e.g., UL-OFDMA sensing), allocating a narrow bandwidth to each STA, or both, allows for efficient collection of sensing data from a large number of STAs and identification of candidate STAs for sensing operations (e.g., motion sensing). For example, some STAs may be included in one or more sensing operations, and other STAs may not be included in such sensing operations. In this way, greater amounts of bandwidth (e.g., more RUs or RUs including a greater range of frequency resources) may be allocated to the STAs that are included in the sensing operations, resulting in improved sensing performance. In some examples, sensing operations as described herein may be performed multiple times or periodically, since a location of motion may change over time, and a determination or identification of STAs to be used for a sensing procedure may also change over time.

Aspects of the disclosure are initially described in the context of a wireless communications system. Aspects of the disclosure are then described in the context of a wireless communications systems and a process flow. Aspects of the disclosure are further illustrated by and described with reference to apparatus diagrams, system diagrams, and flowcharts that relate to uplink multiple access sounding sequences FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

In some wireless communications systems, such the WLAN 100, multiple devices may attempt to sense a communication channel used by the devices. For example, the AP 105 and one or more STAs 115 may participate in sensing operations, and the one or more STAs 115 may participate in sensing operations via uplink orthogonal frequency division multiple access (UL-OFDMA), thereby allowing the AP 105 to more quickly and accurately determine which APs 105 to use for the sensing operation, as well as more quickly and accurately perform the sensing operation itself. For example, the AP 105 may communicate with the one or more STAs 115 and may allocate frequency resources (e.g., in a UL-OFDMA scheme) to different STAs 115 (e.g., in addition to spatial resources, time resources, or both) for use in the sensing operations. For example, the AP 105 may transmit a first message (e.g., a polling trigger frame, a sounding trigger frame, a reporting trigger frame, or any combination thereof) that may trigger the one or more STAs 115 to transmit one or more second messages (e.g., a CTS-to-self message, an NDP message, a report, or any combination thereof) that may be measured or otherwise processed by the AP 105 as part of a sensing operation. The second messages transmitted by the STAs 115 may be transmitted using differing frequency resources (e.g., using UL-OFDMA), differing spatial resources, differing time resources, or any combination thereof.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier sense multiple access, collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
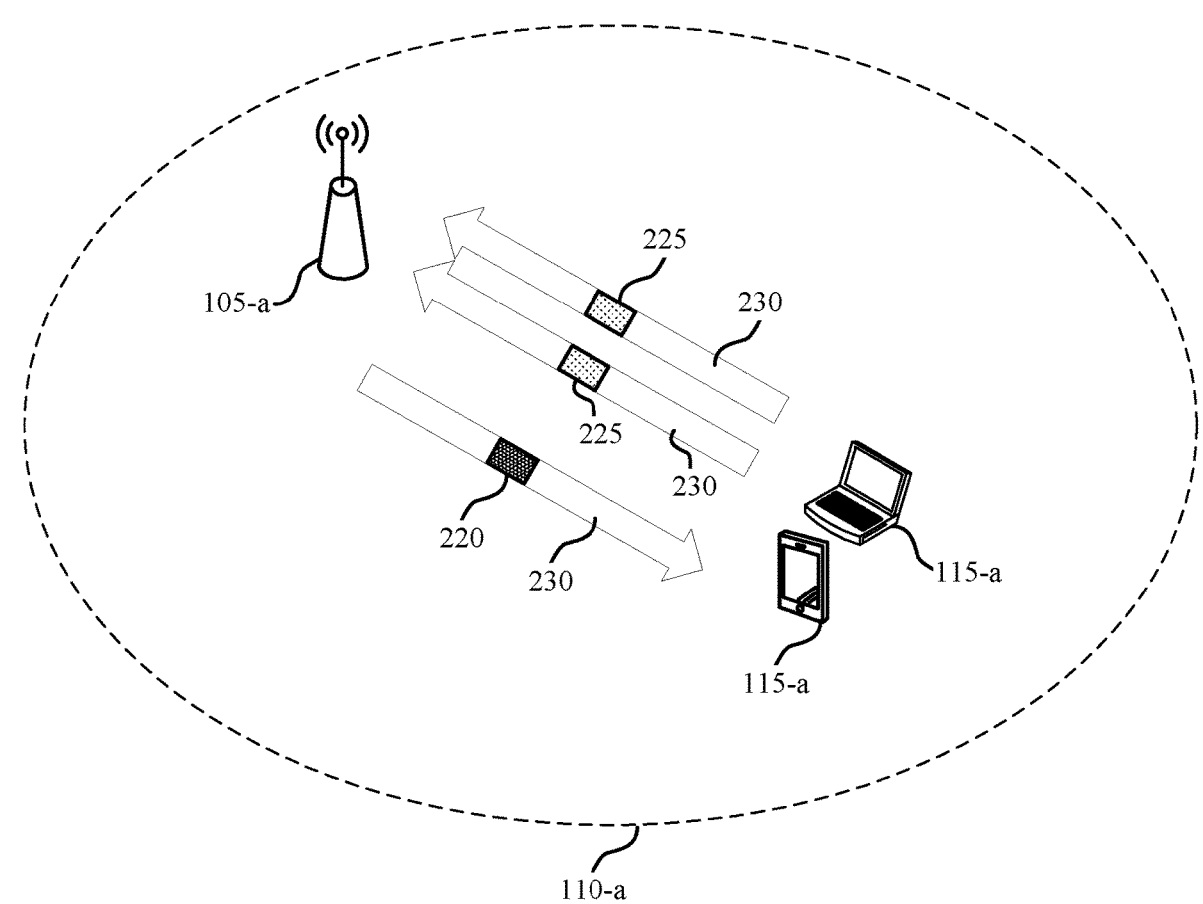
FIG. 2 illustrates an example of a wireless communications system that supports uplink multiple access sounding sequences in accordance with one or more aspects of the present disclosure.
Figure 2:
Figure 2:

FIG. 2 illustrates an example of a wireless communications system 200 that supports uplink multiple access sounding sequences in accordance with one or more aspects of the present disclosure. The wireless communications system 200 may implement or be implemented to realize aspects of the WLAN 100. For example, the wireless communications system 200 illustrates communication between an AP 105-a and multiple STAs 115-a that may communicate within a coverage area 110-a via communication links 230. Though operations are described with reference to the AP 105-a and the STAs 115-a, such operations may also be performed by other devices associated with the WLAN 100. For example, operations described with reference to the AP 105-a may also be performed by a STA, and operations described with reference to the STAs 115-a may also be performed by an AP.

In the course of wireless communications, wireless communications devices may communicate over channels that may have varying conditions. Channel state information (CSI) may describe how a wireless signal propagates (e.g., from a transmitter to a receiver) and may describe one or more qualities or characteristics of a wireless communications channel. For example, CSI may represent individual or combined effects of scattering, fading, reflection, power decay, or any combination thereof. Additionally, or alternatively, CSI may reflect changes in qualities or characteristics of the channel over time, such as varying multipath reflection induced by the existence of moving objects due to its frequency diversity. For example, changes in one or more CSI properties may be used to detect motion, estimate change in location, determine change in motion pattern, or other aspects of an environment in which one or more of the wireless devices may operate. In some examples, raw or processed CSI information may be used for radio frequency (RF) sensing (e.g., in-phase and quadrature (I/Q) numbers for one or more tones present in a frequency domain within a bandwidth). Some or all such CSI properties or information may be processed by one or more algorithms to detect different aspects of presence, motion, or other events or objects present in an operating environment and may be used in various sensing applications, such as accurate location tracking, motion detection for home or office security, breathing rate monitoring, elderly fall detection, other sensing applications, or any combination thereof.

Some sensing approaches utilize multiple STAs, and a coordinating device (e.g., an AP) may utilize various methods for selecting STAs or other devices for use in a sensing operation. In some examples, a coordinating device may schedule or allocate various resources for the various STAs or other devices to use for transmissions that may be used for the sensing operations, such as time resources, spatial resources, frequency resources, or any combination thereof. For example, the AP 105-a may transmit a first message 220 to one or more STAs 115-a. Such a first message 220 may trigger transmission of a second message 225 by one or more of the STAs 115-a that receive the first message 220.

Additionally, or alternatively, the first message 220 may allocate resources to the one or more STAs 115-a for transmission of their respective second message 225. For example, the first message 220 may allocate time-based resources, spatially-based resources, frequency-based resources, or any combination thereof for transmission of the second message 225. In some examples, the first message 220 may allocate respective frequency-based resources for the one or more STAs 115-a to transmit their respective one or more second message 225. For example, such frequency-based resources may be referred to as resource units (RUs). Such respective frequency-based resources or RUs may span a portion of a channel bandwidth of a channel. For example, given an 80 MHz bandwidth, four different STAs 115-a may each be assigned or allocated a 20 MHz portion of the 80 MHz bandwidth for use in sensing operations. The division of frequency-based resources may be equal among multiple STAs or may be unequal.

The AP 105-a may perform channel sensing measurements one the second message 225 received from each of the one or more STAs 115-a. For example, the AP 105-a may determine, select, or otherwise obtain one or more characteristics, qualities, or aspects of the channel that may be used for sensing operations (e.g., location determination, object tracking, or other sensing operations). In some examples, the channel sensing measurements may be performed based on a preamble of the second message. For example, the channel sensing measurements may be performed based on a preamble of a CTS-to-self message, a preamble of an uplink null data packet, a preamble of an uplink report, or any combination thereof. The second message 225 transmitted by each of the one or more STAs 115-a may be transmitted based on the allocation of resources from the first message 220. For example, each of the one or more STAs 115-a may transmit a respective second message 225 to the AP 105-a over the resources allocated in the first message 220.

The AP 105-a (or other device) may estimate one or more channels used for communications and may do so based on one or more of the channel sensing measurements that were performed on one or more of the second messages 225 transmitted by the one or more STAs 115-a. In this way, the wireless communications system 200 may perform one or more sensing operations using various frequency resources (e.g., in an UL-OFDMA approach), thereby increasing accuracy and speed of one or more portions of sensing operations.

Figure 3:
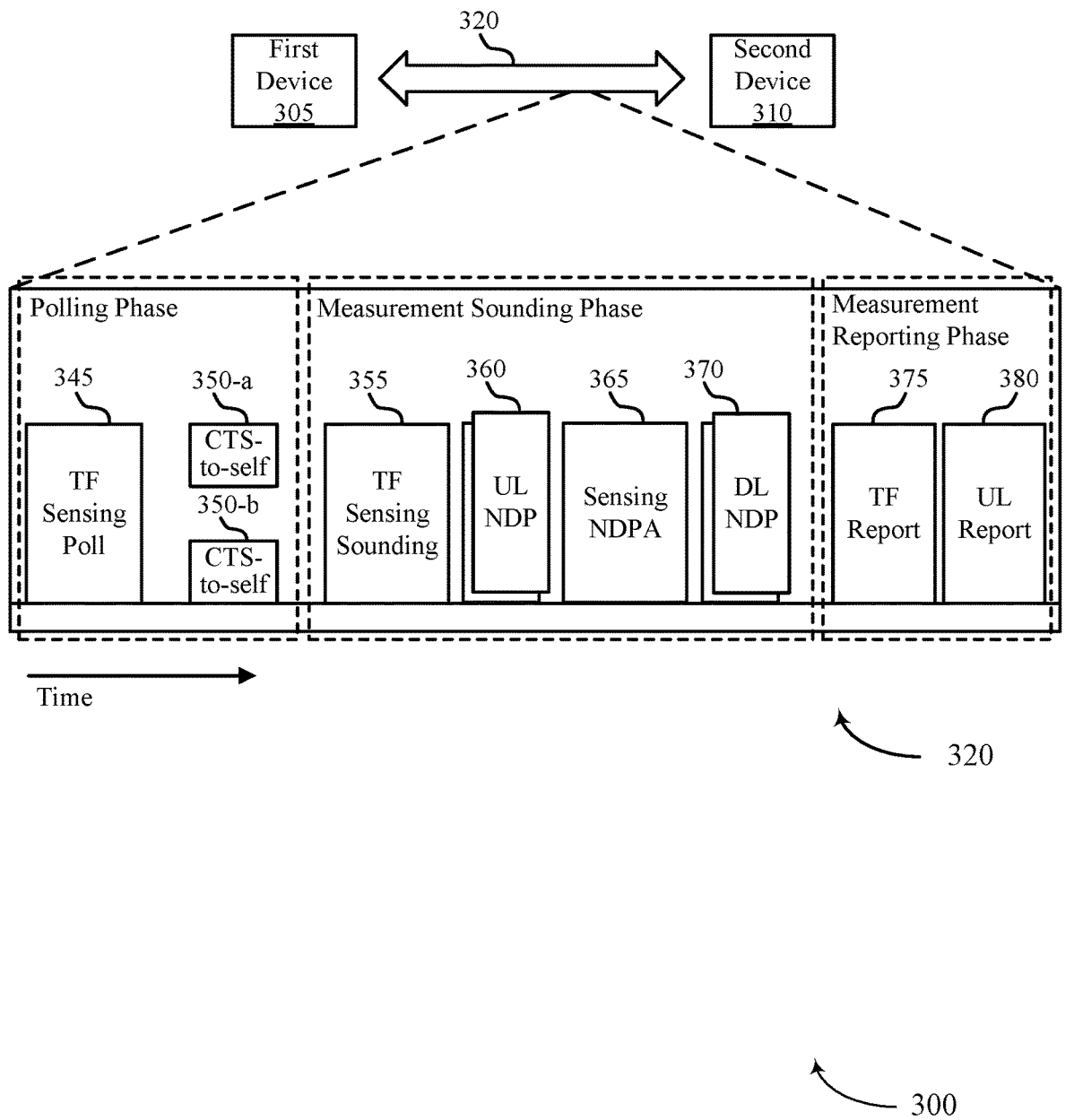
FIG. 3 illustrates an example of a wireless communications system that supports uplink multiple access sounding sequences in accordance with one or more aspects of the present disclosure.

FIG. 3 illustrates an example of a wireless communications system 300 that supports uplink multiple access sounding sequences in accordance with one or more aspects of the present disclosure. The wireless communications system 300 may implement or be implemented to realize aspects of the WLAN 100. For example, the wireless communications system 300 illustrates communication between a first device 305 and a second device 310 via a communication link 320, and the first device 305 and the second device 310 may each be an example of a STA 115 or an AP 105 as illustrated by and described with reference to FIGS. 1 and 2. In some implementations, the first device 305 and the second device 310 may support one or more signaling or messaging designs to support a sensing procedure involving UL-OFDMA. In some aspects, the first device 305 may be an initiating device (ID) and the second device 310 may be a responding device (RD). Alternatively, the second device 310 may be an ID and the first device 305 may be an RD. Further, although referred to as an ID or an RD, such a role of ID or RD may be taken by either a STA 115 or an AP 105.

As described herein, a first device 305 may transmit a first message to one or more second devices 310, and the first message may trigger transmission of a second message from the one or more second devices 310. The second message may be used by the first device 305 to perform channel sensing measurements and such channel sensing measurements may be used to estimate one or more wireless communications channels (e.g., associated with sensing operations). In some examples, the first messages and second messages may be of various different types, or multiple different messages or types of messages may be employed in associated with sensing operations.

In some scenarios for channel sensing involving UL-OFDMA, such operations may take place during or in association with a polling phase. For example, the first device 305 (which may be an example of an ID) may transmit a trigger frame for sensing poll 345 as the first message to one or more second devices 310 (which may be examples of RDs). In response, the one or more second devices 310 may accordingly transmit a clear-to-send (CTS)-to-self message 350 as the second messages. For example, a first second device 310 may transmit a CTS-to-self message 350-a and a second device 310 may transmit CTS-to-self message 350-b. The trigger for sensing poll 345 may allocate frequency-based resources (e.g., RUs) to the various second devices 310, and the CTS-to-self messages 350 may be transmitted over the frequency-based resources or RUs as allocated to the various second devices 310 in the trigger frame for sensing trigger frame for sensing poll 345. The first device 305 may then perform channel sensing measurements on the received CTS-to-self messages 350 and may further estimate one or more channels based on the channel sensing measurements.

In some examples, the first device 305 may transmit multiple trigger frames for sensing poll 345. In such examples, each trigger frame for sensing poll 345 may trigger different sets of second devices 310. For example, the first device 305 may trigger a first set of second devices 310 with a first trigger frame for sensing poll 345 and may receive various CTS-to-self messages 350 from the first set of second devices 310. The first device may then trigger a second set of second devices 310 with a second trigger frame for sensing poll 345 and may receive various CTS-to-self messages 350 from the second set of second devices 310. In some examples, the first trigger frame for sensing poll 345 may include a bit field, a value (e.g., for the bit field), or both, that may indicate that the second set of second devices 310 are to respond to the second trigger from for sensing poll. In this way (or with other approaches), the first device 305 may indicate to multiple sets of second devices 310 to which trigger for sensing poll 345 each set of second devices 310 is to respond.

In some examples, the first device 305 may allocate different RUs or frequency-based resources to different second devices 310 in different trigger frames for sensing poll 345. For example, in a first trigger frame for sensing poll 345, the first device 305 may allocate a first RU to a second device 310 and may, in a second trigger frame for sensing poll 345, allocate a second RU to the same second device 310. The second device 310 may respond with a first CTS-to-self message 350 in response to the first trigger frame for sensing poll 345 and may respond with a second CTS-to-self message 350 in response to the second trigger frame for sensing poll 345. Such approaches may be extended to any number of RUs and trigger frames for sensing poll 345 and may effectively cover a full bandwidth with the number of trigger frames for sensing poll 345 and CTS-to-self messages 350. Such approaches for multiple iterations may also be extended to multiple second devices 310 such that each second device 310 that has been assigned RUs may effectively perform sensing operations throughout a full bandwidth.

The first device 305 may perform channel sensing measurements on the received CTS-to-self messages 350 from both sets of the second devices 310, and may estimate one or more channels based on the channel sensing measurements (e.g., either collectively or individually for both sets of second devices 310). In this way, the first device 305 may trigger a greater number of second devices 310 for sounding operations within a single transmission opportunity.

In some scenarios for channel sensing involving UL-OFDMA, sensing operations may take place during or in association with a measurement sounding phase. For example, the first device 305 may transmit a trigger frame for sensing sounding 355 as the first message to the one or more second devices 310, which may include an allocation of frequency-based resources or RUs for the one or more second devices 310 to use for transmitting respective second messages. In some examples, the one or more second devices 310 may transmit one or more uplink (UL) null data packets (NDPs) 360 as the second messages. For example, one second device 310 may transmit a UL NDP 360 as a respective second message and another second device 310 may also transmit a UL NDP 360 as a respective second message. The trigger for sensing sounding 355 may allocate frequency-based resources (e.g., RUs) to the various second devices 310, and the UL NDPs 360 may be transmitted over the frequency-based resources or RUs as allocated to the various second devices 310 in the trigger frame for sensing trigger frame for sensing poll 345. The first device 305 may then perform channel sensing measurements on the received UL NDPs 360 and may further estimate one or more channels based on the channel sensing measurements.

In some examples involving the measurement sounding phase, the first device 305 or another device may transmit one or more downlink (DL) NDPs 370 in connection with the measurement sounding phase (e.g., for one or more other devices to perform a sensing operation). In some examples, the first device 305 may transmit a sensing NDP announcement (NDPA) 365.

In some examples, the first device 305 may trigger multiple trigger frames for sensing sounding 355. In such examples, each trigger frame for sensing sounding 355 may trigger different sets of second devices 310. For example, the first device 305 may trigger a first set of second devices 310 with a first trigger frame for sensing sounding 355 and may receive various UL NDPs 360 from the first set of second devices 310. The first device may then trigger a second set of second devices 310 with a second trigger frame for sensing sounding 355 and may receive various UL NDPs 360 from the second set of second devices. The first device 305 may perform channel sensing measurements on the received UL NDPs 360 from both sets of the second devices 310 and may estimate one or more channels based on the channel sensing measurements (e.g., either collectively or individually for both sets of second devices 310). In this way, the first device 305 may trigger a greater number of second devices 310 for sounding operations within a single transmission opportunity.

In some scenarios for channel sensing involving UL-OFDMA, sensing operations may take place during or in association with a measurement reporting phase. For example, the first device 305 may transmit a trigger frame for reporting 375 as the first message to the one or more second devices 310, which may include an allocation of frequency-based resources or RUs for the one or more second devices 310 to use for transmitting respective second messages. In response, the one or more second devices 310 may accordingly transmit one or more UL reports 380 as the second messages. For example, a first second device 310 may transmit a UL report 380 as a respective second message and a second device 310 may also transmit a UL report 380 as a respective second message. The trigger frame for reporting 375 may allocate frequency-based resources (e.g., RUs) to the various second devices 310, and the UL reports 380 may be transmitted over the frequency-based resources or RUs as allocated to the various second devices 310 in the trigger frame for reporting 375. The first device 305 may then perform channel sensing measurements on the received UL reports 380 and may further estimate one or more channels based on the channel sensing measurements.

Figure 4:
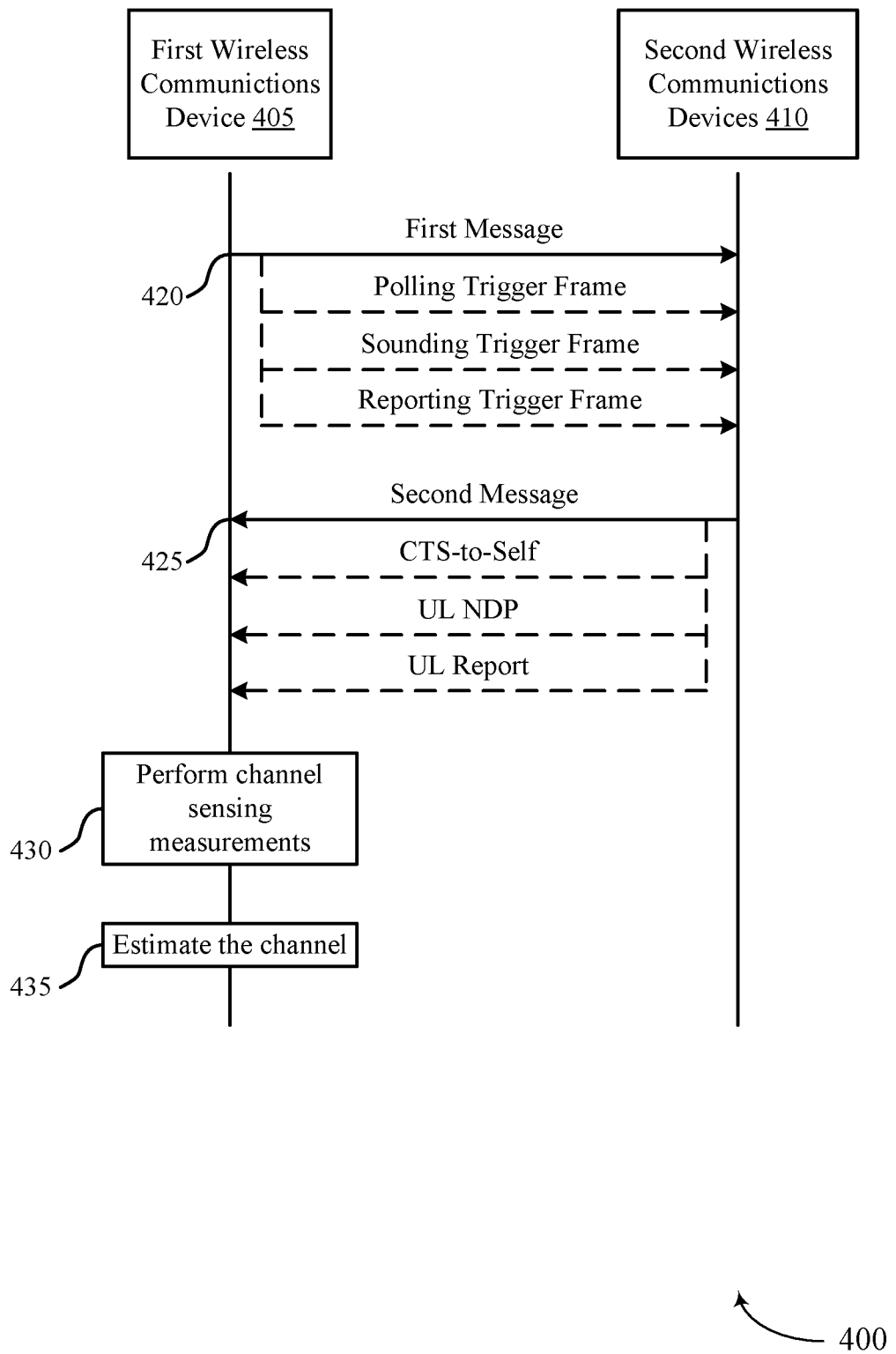
FIG. 4 illustrates an example of a process flow that supports uplink multiple access sounding sequences in accordance with one or more aspects of the present disclosure.

FIG. 4 illustrates an example of a process flow 400 that supports uplink multiple access sounding sequences in accordance with one or more aspects of the present disclosure. The process flow 400 may implement various aspects of the present disclosure described with reference to FIGS. 1-3. The process flow 400 may include a first wireless communications device 405, which may be examples of similarly named elements as described with reference to FIGS. 1-3 (e.g., APs 105, STAs 115, first device 305, and second device 310).

In the following description of the process flow 400, the operations between the first wireless communications device 405 and the one or more second wireless communications devices 415 may be performed in different orders or at different times. Some operations may also be left out of the process flow 400, or other operations may be added. Although the first wireless communications device 405 and the one or more second wireless communications devices 415 are shown performing the operations of the process flow 400, some aspects of some operations may also be performed by other elements of the process flow 400 or by elements that are not depicted in the process flow, or any combination thereof.

At 420, the first wireless communications device 405 may transmit, to one or more second wireless communications devices 415, a first message that triggers transmission of a second message by each of the one or more second wireless communications devices 415, the first message allocating to each of the one or more second wireless communications devices 415 a respective frequency-based resource unit for transmission of the second message, each of the respective frequency-based resource units spanning a portion of a channel bandwidth of a channel. In some examples, the first wireless communications device 405 may transmit multiple instances of the first message to different sets of the one or more second wireless communications devices 415 during a single sounding sequence.

In some examples, the first wireless communications device 405 may transmit multiple instances of the first message. The first wireless communications device 405 may allocate, during transmission of a first instance of the first message, a first frequency-based resource unit for transmission of a first instance of the second message by one of the one or more second wireless communications devices 415. The first wireless communications device 405 may allocate, during transmission of a second instance of the first message, a second frequency-based resource unit for transmission of a second instance of the second message by the one of the one or more second wireless communications devices 415.

In some examples, the first wireless communications device 405 may transmit a polling trigger frame as the first message to the one or more second wireless communications devices 415, the polling trigger frame triggering the one or more second wireless communications devices 415 to transmit a clear-to-send to self message as the second message on the respective frequency-based resource units. In some examples, the first wireless communications device 405 may transmit a first polling trigger frame to at least a first set of one or more second wireless communications devices 415 and a second polling trigger frame to a second set of the one or more second wireless communications devices 415, the first polling trigger frame and the second polling trigger frame triggering the one or more second wireless communications devices 415 to transmit a clear-to-send to self message as the second message on the respective frequency-based resource units. In some examples, the first polling trigger frame may include a bit field with a value that indicates that the second set of the one or more second wireless communications devices 415 are to respond to the second polling trigger frame.

In some examples, the first wireless communications device 405 may transmit a sounding trigger frame as the first message to the one or more second wireless communications devices 415, the sounding trigger frame triggering the one or more second wireless communications devices 415 to transmit an uplink null data packet as the second message on the respective frequency-based resource units. In some examples, the first wireless communications device 405 may transmit a first sounding trigger frame to a first set of one or more second wireless communications devices 415 and a second sounding trigger frame to a second set of the one or more second wireless communications devices 415, the first sounding trigger frame and the second sounding trigger frame triggering the one or more second wireless communications devices 415 to transmit an uplink null data packet as the second message on the respective frequency-based resource units.

In some examples, the first wireless communications device 405 may transmit a reporting trigger frame as the first message to the one or more second wireless communications devices, the reporting trigger frame triggering the one or more second wireless communications devices 415 to transmit an uplink report as the second message on the respective frequency-based resource units.

In some examples, the first wireless communications device and the one or more second wireless communications devices may operate in a wireless local area network.

At 425, the first wireless communications device 405 may receive the second message from each of the one or more second wireless communications devices 415 on the respective frequency-based resource units. The second messages may be CTS-to-self messages, UL NDPs, UL reports, or any combination thereof.

At 430, the first wireless communications device 405 may perform channel sensing measurements on the second message received from each of the one or more second wireless communications devices 415, respective second messages received on the respective frequency-based resource units. In some examples, the first wireless communications device 405 may perform the channel sensing measurements based on a preamble of the second message. In some examples, the first wireless communications device 405 may perform the channel sensing measurements at least one of a preamble portion of the clear-to-send to self message on the respective frequency-based resource units, an uplink null data packet on the respective frequency-based resource units, or a preamble portion of an uplink report on the respective frequency-based resource units.

At 435, the first wireless communications device 405 may estimate the channel based on the channel sensing measurements performed on the respective second messages received on the respective frequency-based resource units.

Figure 5:
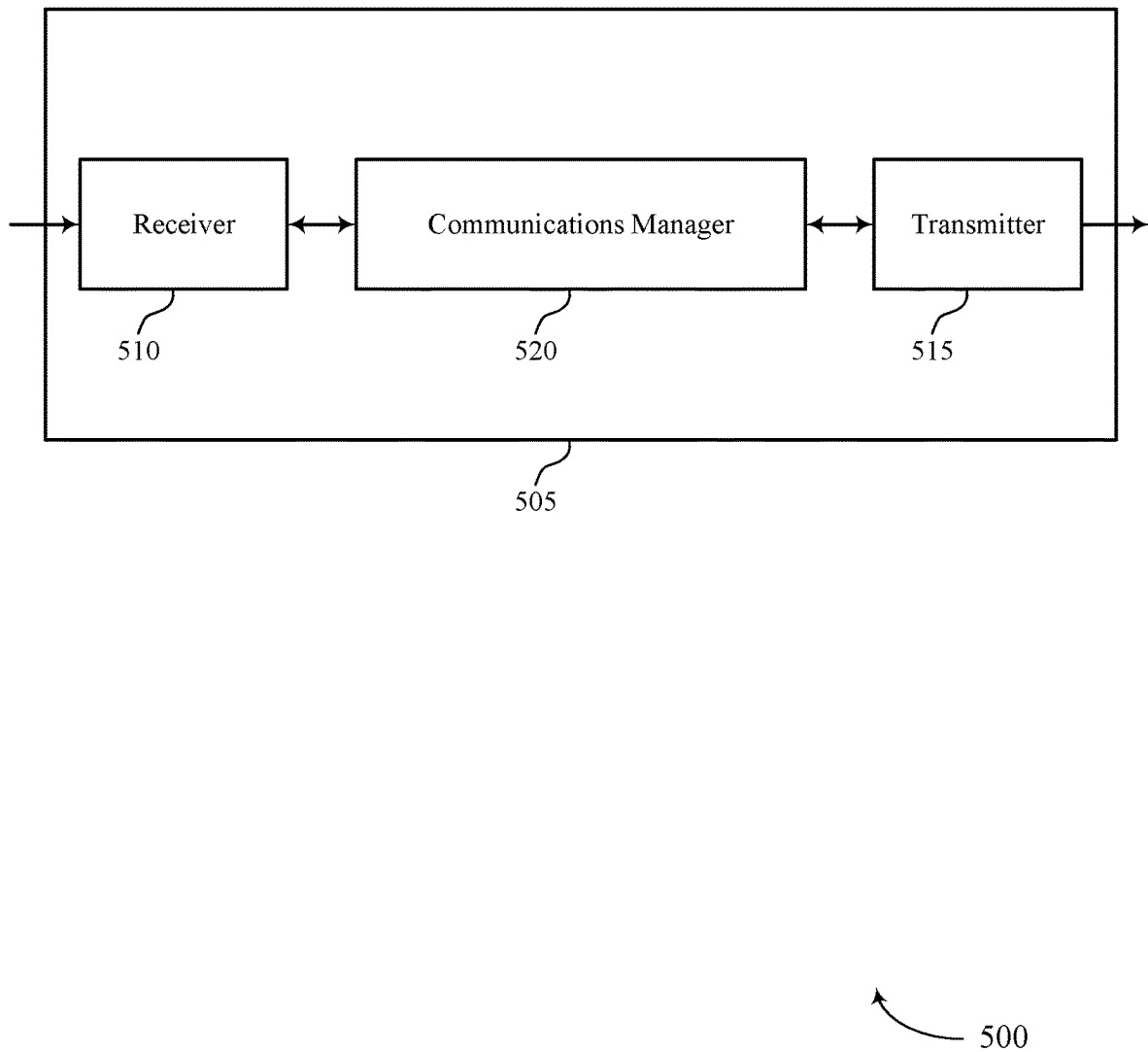
FIGS. 5 and 6 show block diagrams of devices that support uplink multiple access sounding sequences in accordance with one or more aspects of the present disclosure.

FIG. 5 shows a block diagram 500 of a device 505 that supports uplink multiple access sounding sequences in accordance with one or more aspects of the present disclosure. The device 505 may be an example of aspects of an AP as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink multiple access sounding sequences). Information may be passed on to other components of the device 505. The receiver 510 may utilize a single antenna or a set of multiple antennas.

The transmitter 515 may provide a means for transmitting signals generated by other components of the device 505. The transmitter 515 may utilize a single antenna or a set of multiple antennas.

The communications manager 520, the receiver 510, the transmitter 515, or various combinations thereof or various components thereof may be examples of means for performing various aspects of uplink multiple access sounding sequences as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first wireless communications device in accordance with examples as disclosed herein. For example, the communications manager 520 may be configured as or otherwise support a means for transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The communications manager 520 may be configured as or otherwise support a means for performing channel sensing measurements on the second message received from each of the one or more second wireless communications devices, respective second messages received on the respective frequency-based resource units. The communications manager 520 may be configured as or otherwise support a means for estimating the channel based on the channel sensing measurements performed on the respective second messages received on the respective frequency-based resource units.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:
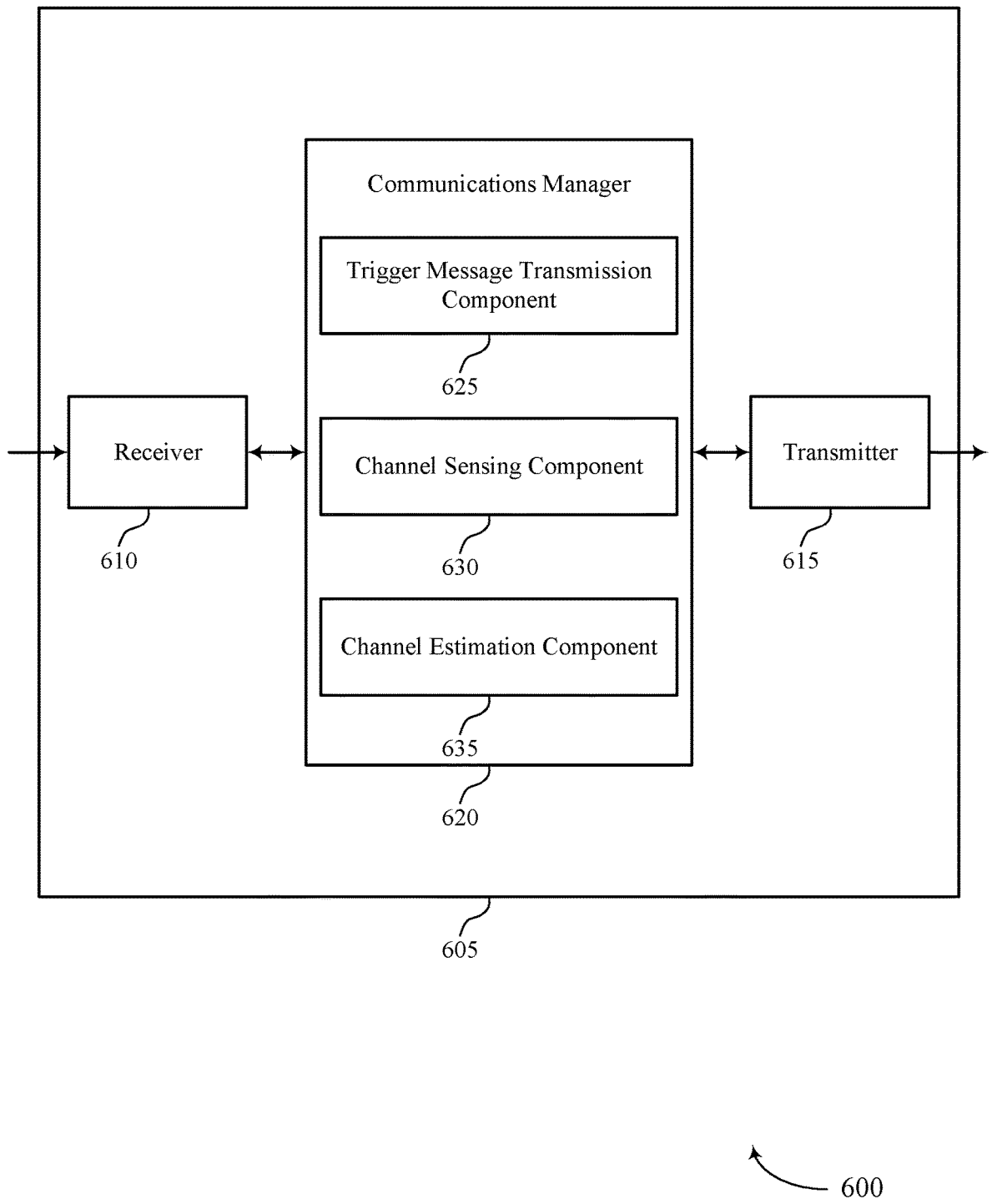

FIG. 6 shows a block diagram 600 of a device 605 that supports uplink multiple access sounding sequences in accordance with one or more aspects of the present disclosure. The device 605 may be an example of aspects of a device 505 or an AP 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink multiple access sounding sequences). Information may be passed on to other components of the device 605. The receiver 610 may utilize a single antenna or a set of multiple antennas.

The transmitter 615 may provide a means for transmitting signals generated by other components of the device 605. The transmitter 615 may utilize a single antenna or a set of multiple antennas.

The device 605, or various components thereof, may be an example of means for performing various aspects of uplink multiple access sounding sequences as described herein. For example, the communications manager 620 may include a trigger message transmission component 625, a channel sensing component 630, a channel estimation component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless communications device in accordance with examples as disclosed herein. The trigger message transmission component 625 may be configured as or otherwise support a means for transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The channel sensing component 630 may be configured as or otherwise support a means for performing channel sensing measurements on the second message received from each of the one or more second wireless communications devices, respective second messages received on the respective frequency-based resource units. The channel estimation component 635 may be configured as or otherwise support a means for estimating the channel based on the channel sensing measurements performed on the respective second messages received on the respective frequency-based resource units.

Figure 7:
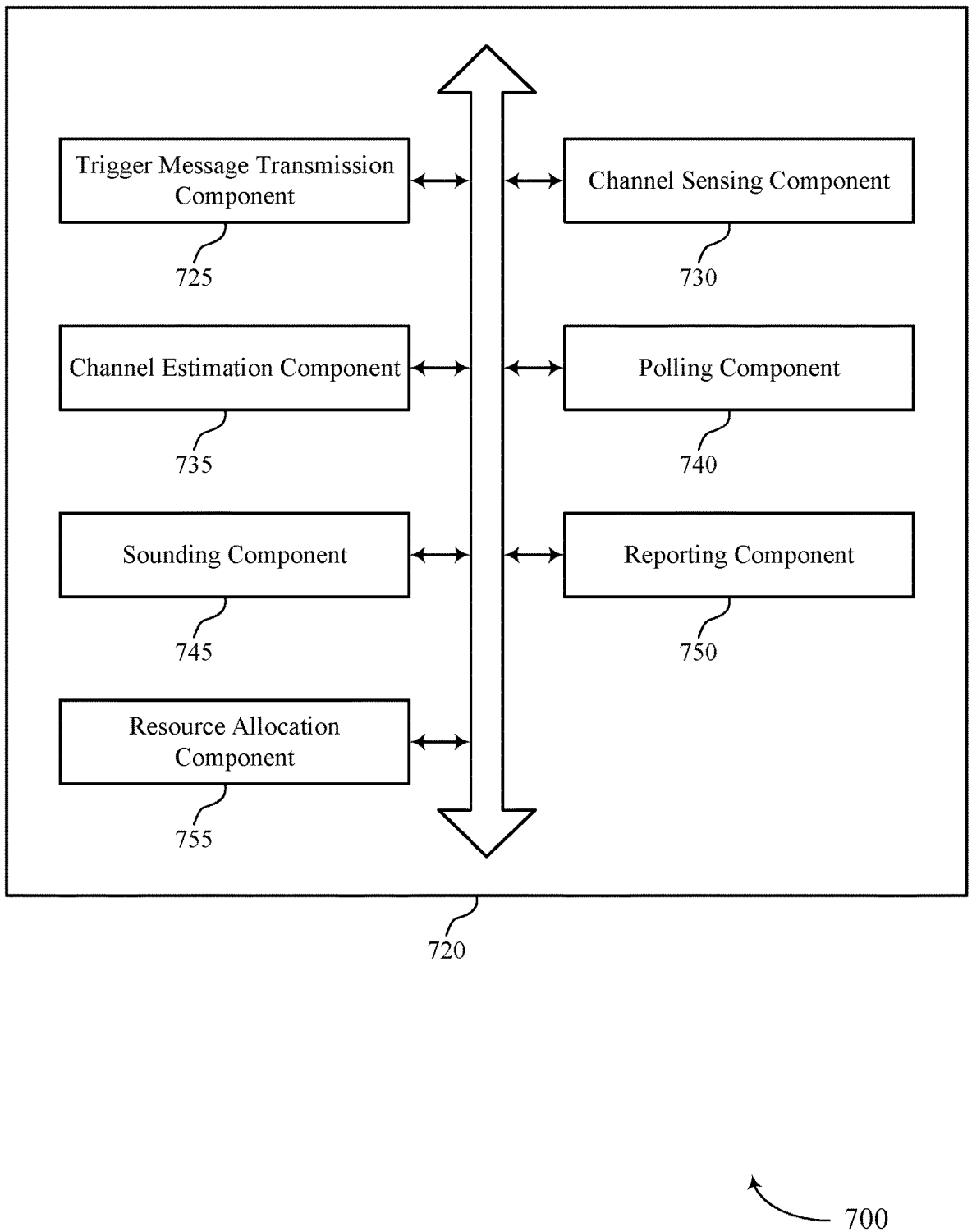
FIG. 7 shows a block diagram of a communications manager that supports uplink multiple access sounding sequences in accordance with one or more aspects of the present disclosure.

FIG. 7 shows a block diagram 700 of a communications manager 720 that supports uplink multiple access sounding sequences in accordance with one or more aspects of the present disclosure. The communications manager 720 may be an example of aspects of a communications manager 520, a communications manager 620, or both, as described herein. The communications manager 720, or various components thereof, may be an example of means for performing various aspects of uplink multiple access sounding sequences as described herein. For example, the communications manager 720 may include a trigger message transmission component 725, a channel sensing component 730, a channel estimation component 735, a polling component 740, a sounding component 745, a reporting component 750, a resource allocation component 755, or any combination thereof. Each of these components may communicate, directly or indirectly, with one another (e.g., via one or more buses).

The communications manager 720 may support wireless communication at a first wireless communications device in accordance with examples as disclosed herein. The trigger message transmission component 725 may be configured as or otherwise support a means for transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The channel sensing component 730 may be configured as or otherwise support a means for performing channel sensing measurements on the second message received from each of the one or more second wireless communications devices, respective second messages received on the respective frequency-based resource units. The channel estimation component 735 may be configured as or otherwise support a means for estimating the channel based on the channel sensing measurements performed on the respective second messages received on the respective frequency-based resource units.

In some examples, to support transmitting the first message, the polling component 740 may be configured as or otherwise support a means for transmitting a polling trigger frame as the first message to the one or more second wireless communications devices, the polling trigger frame triggering the one or more second wireless communications devices to transmit a clear-to-send to self message as the second message on the respective frequency-based resource units.

In some examples, to support transmitting the first message, the sounding component 745 may be configured as or otherwise support a means for transmitting a sounding trigger frame as the first message to the one or more second wireless communications devices, the sounding trigger frame triggering the one or more second wireless communications devices to transmit an uplink null data packet as the second message on the respective frequency-based resource units.

In some examples, to support transmitting the first message, the reporting component 750 may be configured as or otherwise support a means for transmitting a reporting trigger frame as the first message to the one or more second wireless communications devices, the reporting trigger frame triggering the one or more second wireless communications devices to transmit an uplink report as the second message on the respective frequency-based resource units.

In some examples, the channel sensing component 730 may be configured as or otherwise support a means for performing the channel sensing measurements based on a preamble of the second message.

In some examples, to support performing the channel sensing measurements on the second message received from each of the one or more second wireless communications devices, the channel sensing component 730 may be configured as or otherwise support a means for performing the channel sensing measurements at least one of a preamble portion of the clear-to-send to self message on the respective frequency-based resource units, an uplink null data packet on the respective frequency-based resource units, or a preamble portion of an uplink report on the respective frequency-based resource units.

In some examples, to support transmitting the first message, the trigger message transmission component 725 may be configured as or otherwise support a means for transmitting multiple instances of the first message to different sets of the one or more second wireless communications devices during a single sounding sequence.

In some examples, to support transmitting the multiple instances of the first message to different sets of the one or more second wireless communications devices, the sounding component 745 may be configured as or otherwise support a means for transmitting a first sounding trigger frame to a first set of one or more second wireless communications devices and a second sounding trigger frame to a second set of the one or more second wireless communications devices, the first sounding trigger frame and the second sounding trigger frame triggering the one or more second wireless communications devices to transmit an uplink null data packet as the second message on the respective frequency-based resource units.

In some examples, to support transmitting the multiple instances of the first message to different sets of the one or more second wireless communications devices, the polling component 740 may be configured as or otherwise support a means for transmitting a first polling trigger frame to at least a first set of one or more second wireless communications devices and a second polling trigger frame to a second set of the one or more second wireless communications devices, the first polling trigger frame and the second polling trigger frame triggering the one or more second wireless communications devices to transmit a clear-to-send to self message as the second message on the respective frequency-based resource units.

In some examples, the first polling trigger frame includes a bit field with a value that indicates that the second set of the one or more second wireless communications devices are to respond to the second polling trigger frame.

In some examples, to support transmitting the multiple instances of the first message to different sets of the one or more second wireless communications devices, the trigger message transmission component 725 may be configured as or otherwise support a means for transmitting multiple instances of the first message. In some examples, to support transmitting the multiple instances of the first message to different sets of the one or more second wireless communications devices, the resource allocation component 755 may be configured as or otherwise support a means for allocating, during transmission of a first instance of the first message, a first frequency-based resource unit for transmission of a first instance of the second message by one of the one or more second wireless communications devices. In some examples, to support transmitting the multiple instances of the first message to different sets of the one or more second wireless communications devices, the resource allocation component 755 may be configured as or otherwise support a means for allocating, during transmission of a second instance of the first message, a second frequency-based resource unit for transmission of a second instance of the second message by the one of the one or more second wireless communications devices.

In some examples, the first wireless communications device and the one or more second wireless communications devices operate in a wireless local area network.

Figure 8:
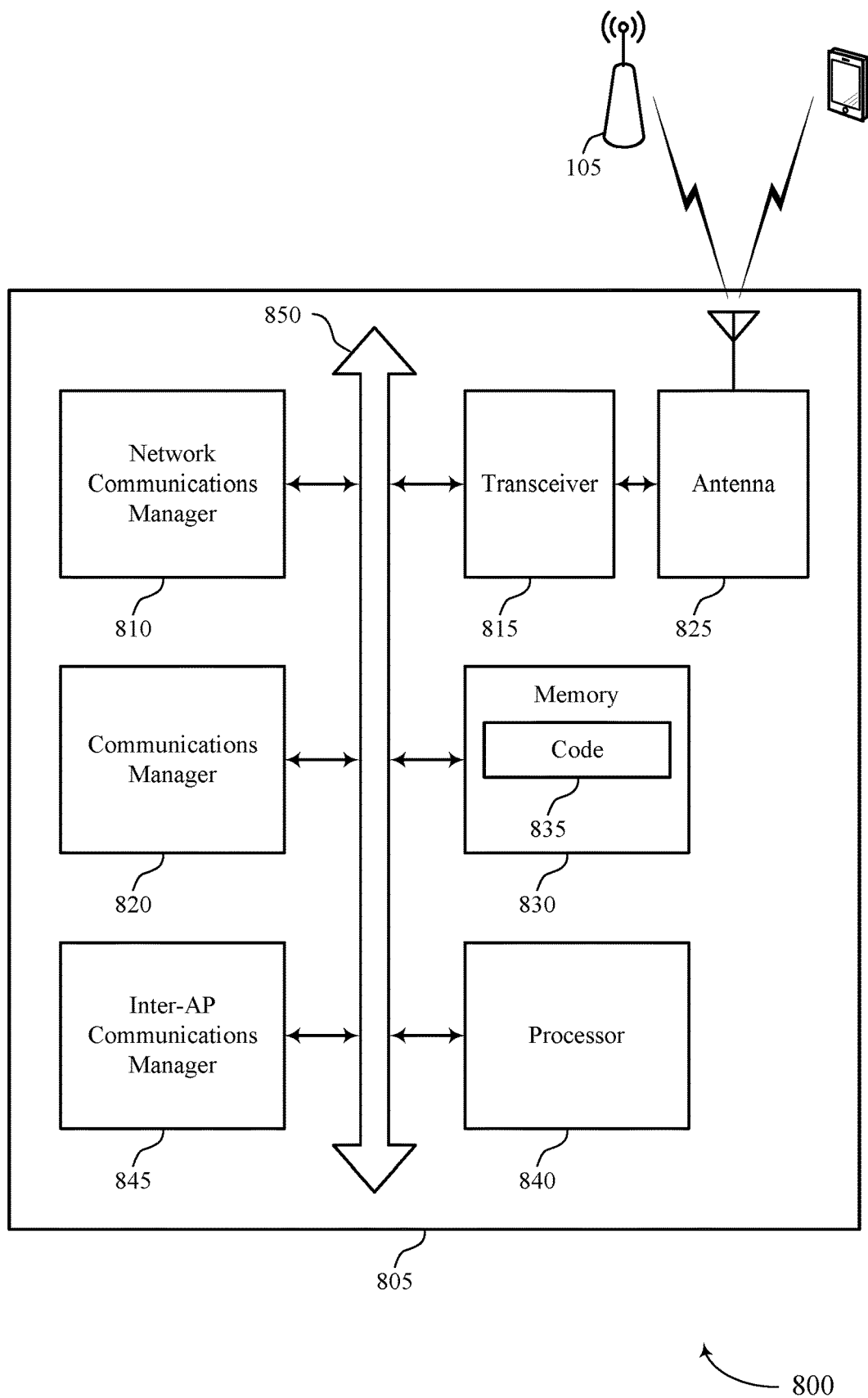
FIG. 8 shows a diagram of a system including a device that supports uplink multiple access sounding sequences in accordance with one or more aspects of the present disclosure.

FIG. 8 shows a diagram of a system 800 including a device 805 that supports uplink multiple access sounding sequences in accordance with one or more aspects of the present disclosure. The device 805 may be an example of or include the components of a device 505, a device 605, or an AP as described herein. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-AP communications manager 845. These components may be in electronic communication or otherwise coupled (e.g., operatively, communicatively, functionally, electronically, electrically) via one or more buses (e.g., a bus 850).

The network communications manager 810 may manage communications with a core network (e.g., via one or more wired backhaul links). For example, the network communications manager 810 may manage the transfer of data communications for client devices, such as one or more STAs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets and provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink multiple access sounding sequences). For example, the device 805 or a component of the device 805 may include a processor 840 and memory 830 coupled with or to the processor 840, the processor 840 and memory 830 configured to perform various functions described herein.

The inter-station communications manager 845 may manage communications with other APs 105, and may include a controller or scheduler for controlling communications with STAs 115 in cooperation with other APs 105. For example, the inter-station communications manager 845 may coordinate scheduling for transmissions to APs 105 for various interference mitigation techniques such as beamforming or joint transmission. In some examples, the inter-station communications manager 845 may provide an X2 interface within an LTE/LTE-A wireless communication network technology to provide communication between APs 105.

The communications manager 820 may support wireless communication at a first wireless communications device in accordance with examples as disclosed herein. For example, the communications manager 820 may be configured as or otherwise support a means for transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The communications manager 820 may be configured as or otherwise support a means for performing channel sensing measurements on the second message received from each of the one or more second wireless communications devices, respective second messages received on the respective frequency-based resource units. The communications manager 820 may be configured as or otherwise support a means for estimating the channel based on the channel sensing measurements performed on the respective second messages received on the respective frequency-based resource units.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 9:
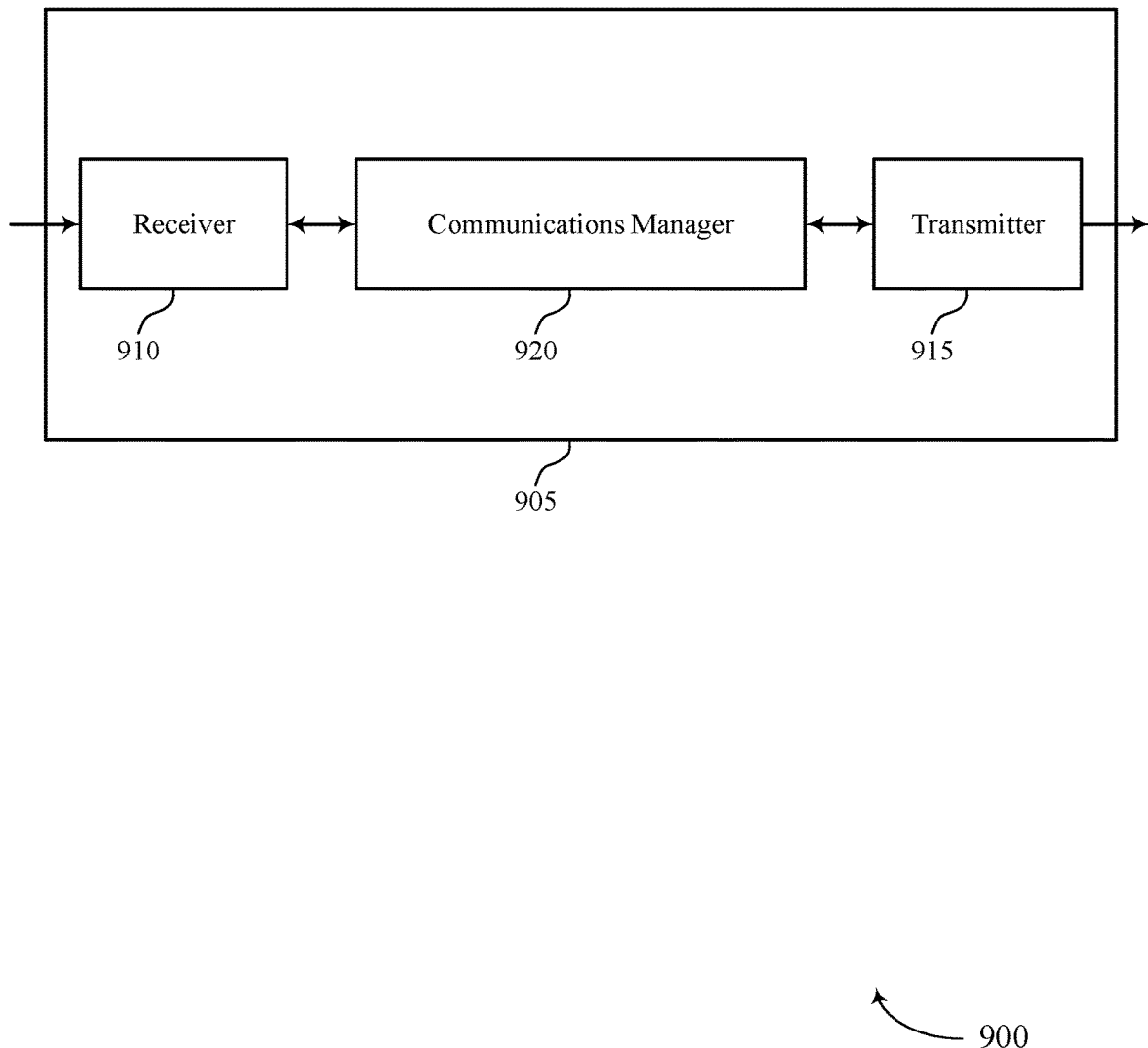
FIGS. 9 and 10 show block diagrams of devices that support uplink multiple access sounding sequences in accordance with one or more aspects of the present disclosure.

FIG. 9 shows a block diagram 900 of a device 905 that supports uplink multiple access sounding sequences in accordance with one or more aspects of the present disclosure. The device 905 may be an example of aspects of an STA as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink multiple access sounding sequences). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink multiple access sounding sequences). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink multiple access sounding sequences as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a second wireless communications device in accordance with examples as disclosed herein. For example, the communications manager 920 may be configured as or otherwise support a means for receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel. The communications manager 920 may be configured as or otherwise support a means for transmitting, to the first wireless communications device, the second message on the frequency-based resource unit based on receiving the first message.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, more efficient utilization of communication resources, or any combination thereof.

Figure 10:
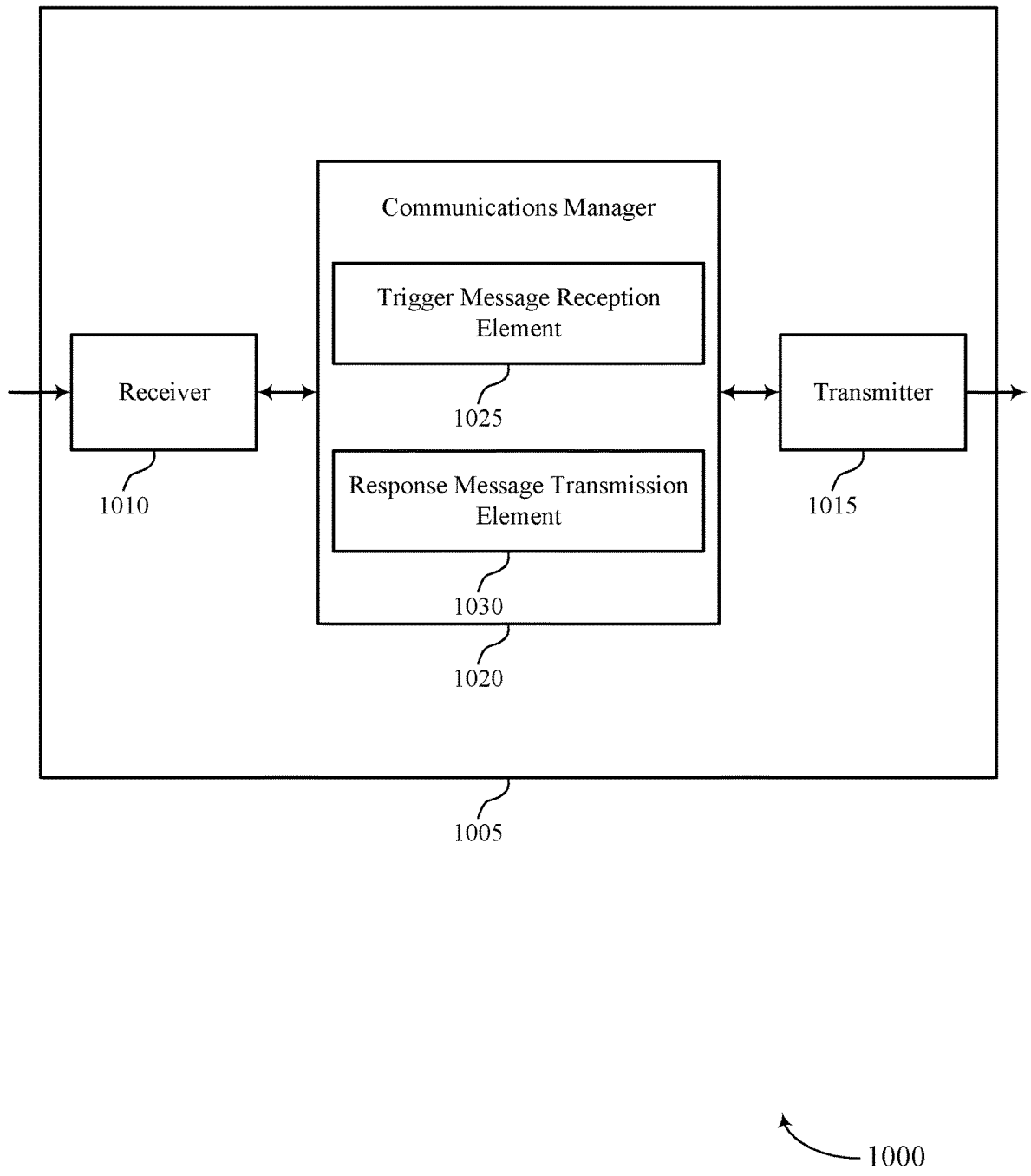

FIG. 10 shows a block diagram 1000 of a device 1005 that supports uplink multiple access sounding sequences in accordance with one or more aspects of the present disclosure. The device 1005 may be an example of aspects of a device 905 or an STA 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink multiple access sounding sequences). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink multiple access sounding sequences). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink multiple access sounding sequences as described herein. For example, the communications manager 1020 may include a trigger message reception element 1025 a response message transmission element 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a second wireless communications device in accordance with examples as disclosed herein. The trigger message reception element 1025 may be configured as or otherwise support a means for receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel. The response message transmission element 1030 may be configured as or otherwise support a means for transmitting, to the first wireless communications device, the second message on the frequency-based resource unit based on receiving the first message.

Figure 11:
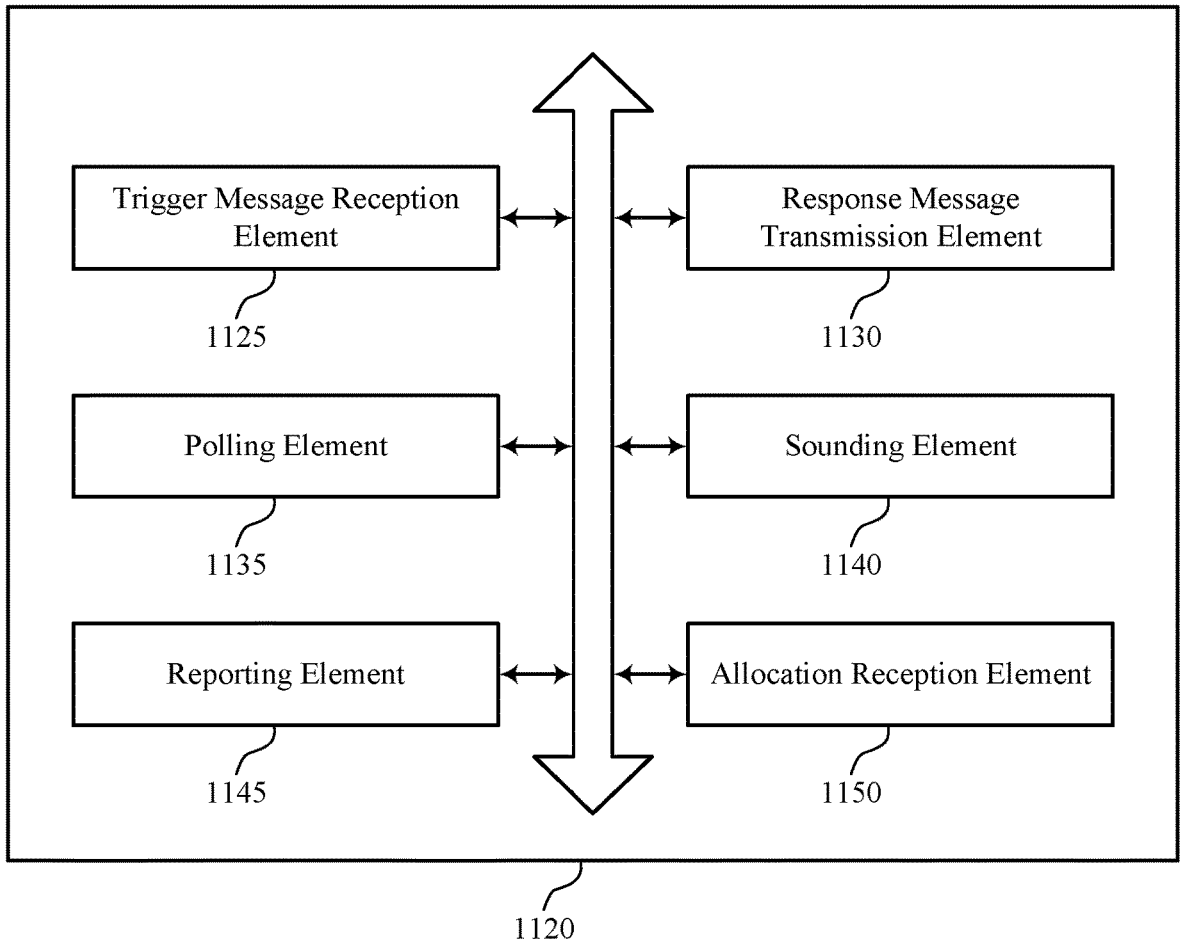
FIG. 11 shows a block diagram of a communications manager that supports uplink multiple access sounding sequences in accordance with one or more aspects of the present disclosure.

FIG. 11 shows a block diagram 1100 of a communications manager 1120 that supports uplink multiple access sounding sequences in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of uplink multiple access sounding sequences as described herein. For example, the communications manager 1120 may include a trigger message reception element 1125, a response message transmission element 1130, a polling element 1135, a sounding element 1140, a reporting element 1145, an allocation reception element 1150, or any combination thereof. Each of these components may communicate, directly or indirectly, with one another (e.g., via one or more buses).

The communications manager 1120 may support wireless communication at a second wireless communications device in accordance with examples as disclosed herein. The trigger message reception element 1125 may be configured as or otherwise support a means for receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel. The response message transmission element 1130 may be configured as or otherwise support a means for transmitting, to the first wireless communications device, the second message on the frequency-based resource unit based on receiving the first message.

In some examples, to support receiving the first message, the polling element 1135 may be configured as or otherwise support a means for receiving a polling trigger frame as the first message from the first wireless communications device, the polling trigger frame triggering the second wireless communications device to transmit a clear-to-send to self message as the second message on the frequency-based resource unit. In some examples, to support receiving the first message, the polling element 1135 may be configured as or otherwise support a means for transmitting the clear-to-send to self message as the second message on the frequency-based resource unit.

In some examples, to support receiving the first message, the sounding element 1140 may be configured as or otherwise support a means for receiving a sounding trigger frame as the first message from the first wireless communications device, the sounding trigger frame triggering the second wireless communications device to transmit an uplink null data packet as the second message on the frequency-based resource unit. In some examples, to support receiving the first message, the sounding element 1140 may be configured as or otherwise support a means for transmitting the uplink null data packet as the second message on the frequency-based resource unit.

In some examples, to support receiving the first message, the reporting element 1145 may be configured as or otherwise support a means for receiving a reporting trigger frame as the first message from the first wireless communications device, the reporting trigger frame triggering the second wireless communications device to transmit an uplink report as the second message on the frequency-based resource unit. In some examples, to support receiving the first message, the reporting element 1145 may be configured as or otherwise support a means for transmitting the uplink report as the second message on the frequency-based resource unit.

In some examples, channel sensing measurements are performed by the first wireless communications device based on a preamble of the second message.

In some examples, the polling element 1135 may be configured as or otherwise support a means for transmitting, to the first wireless communications device, at least one of a clear-to-send to self message on the frequency-based resource unit, an uplink null data packet on the frequency-based resource unit, or an uplink report on the frequency-based resource unit. In some examples, the polling element 1135 may be configured as or otherwise support a means for where channel sensing measurements are performed on at least one of a preamble portion of the clear-to-send to self message, the uplink null data packet, or a preamble portion of the uplink report.

In some examples, to support receiving the first message, the trigger message reception element 1125 may be configured as or otherwise support a means for receiving at least a first instance of multiple instances of the first message transmitted to different sets of one or more second wireless communications devices during a single sounding sequence.

In some examples, to support receiving at least the first instance of the multiple instances of the first message transmitted to different sets of one or more second wireless communications devices during a single sounding sequence, the sounding element 1140 may be configured as or otherwise support a means for receiving, from the first wireless communications device, a first sounding trigger frame transmitted to a first set of one or more second wireless communications devices, the first set including the second wireless communications device. In some examples, to support receiving at least the first instance of the multiple instances of the first message transmitted to different sets of one or more second wireless communications devices during a single sounding sequence, the sounding element 1140 may be configured as or otherwise support a means for where the first sounding trigger frame and a second sounding trigger frame transmitted to a second set of one or more second wireless communications devices trigger the one or more second wireless communications devices to transmit an uplink null data packet as the second message on respective frequency-based resource units.

In some examples, to support receiving at least the first instance of the multiple instances of the first message transmitted to different sets of one or more second wireless communications devices during a single sounding sequence, the polling element 1135 may be configured as or otherwise support a means for receiving, from the first wireless communications device, a first polling trigger frame transmitted to at least a first set of one or more second wireless communications devices, the first set including the second wireless communications device. In some examples, to support receiving at least the first instance of the multiple instances of the first message transmitted to different sets of one or more second wireless communications devices during a single sounding sequence, the polling element 1135 may be configured as or otherwise support a means for where the first polling trigger frame and a second polling trigger frame transmitted to a second set of the one or more second wireless communications devices trigger the one or more second wireless communications devices to transmit a clear-to-send to self message as the second message on respective frequency-based resource units.

In some examples, the first polling trigger frame includes a bit field with a value that indicates that the second set of the one or more second wireless communications devices are to respond to the second polling trigger frame.

In some examples, to support receiving at least the first instance of the multiple instances of the first message transmitted to different sets of one or more second wireless communications devices during a single sounding sequence, the trigger message reception element 1125 may be configured as or otherwise support a means for receiving the first instance of the multiple instances of the first message and a second instance of the multiple instances of the first message. In some examples, to support receiving at least the first instance of the multiple instances of the first message transmitted to different sets of one or more second wireless communications devices during a single sounding sequence, the allocation reception element 1150 may be configured as or otherwise support a means for receiving, during reception of the first instance, an allocation of a first frequency-based resource unit for transmission of a first instance of the second message by the second wireless communications device. In some examples, to support receiving at least the first instance of the multiple instances of the first message transmitted to different sets of one or more second wireless communications devices during a single sounding sequence, the allocation reception element 1150 may be configured as or otherwise support a means for receiving, during reception of the second instance, an allocation of a second frequency-based resource unit for transmission of a second instance of the second message by the second wireless communications device.

In some examples, the first wireless communications device and the one or more second wireless communications devices operate in a wireless local area network.

Figure 12:
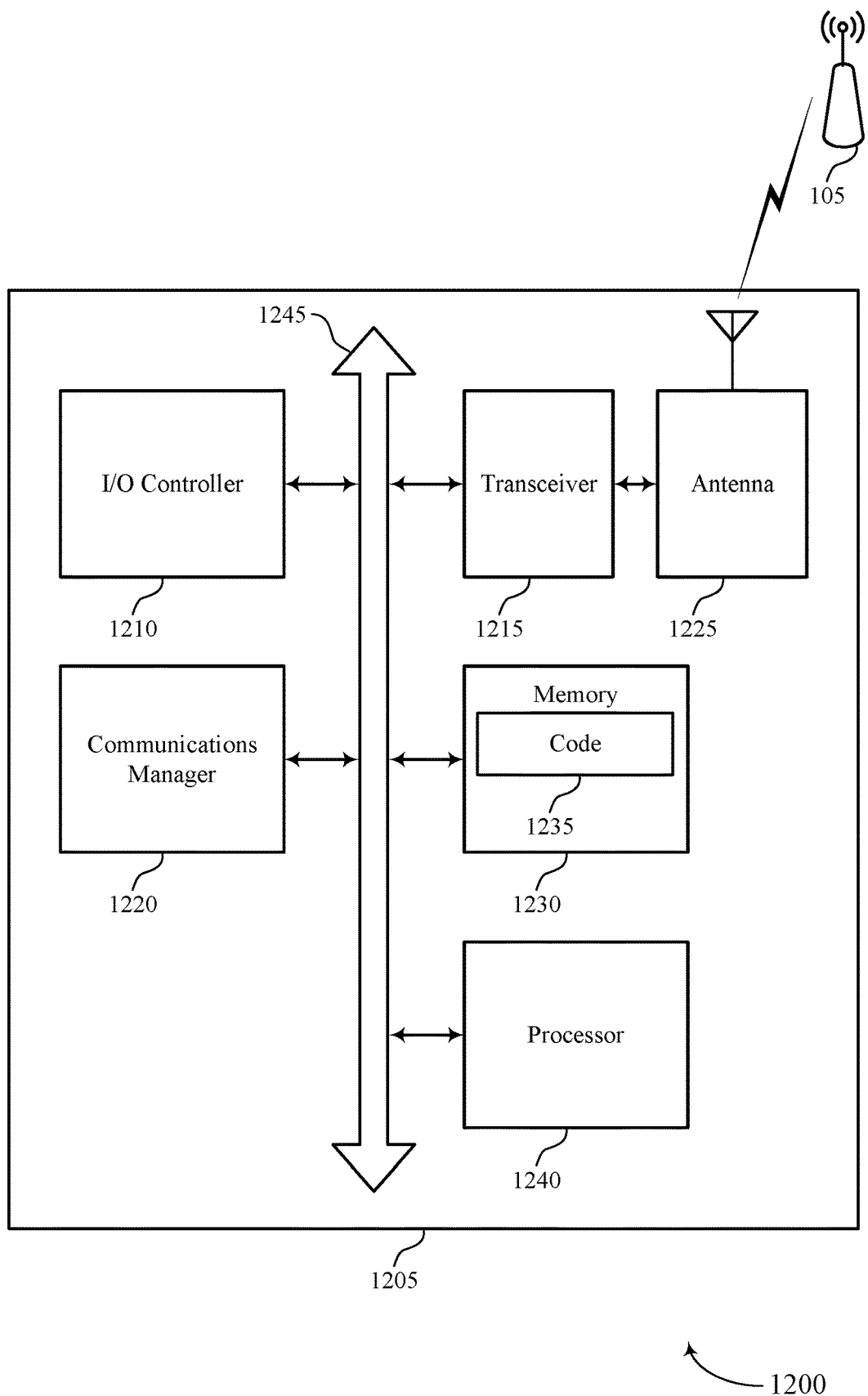
FIG. 12 shows a diagram of a system including a device that supports uplink multiple access sounding sequences in accordance with one or more aspects of the present disclosure.

FIG. 12 shows a diagram of a system 1200 including a device 1205 that supports uplink multiple access sounding sequences in accordance with one or more aspects of the present disclosure. The device 1205 may be an example of or include the components of a device 905, a device 1005, or an STA as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. In some other cases, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink multiple access sounding sequences). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a second wireless communications device in accordance with examples as disclosed herein. For example, the communications manager 1220 may be configured as or otherwise support a means for receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel. The communications manager 1220 may be configured as or otherwise support a means for transmitting, to the first wireless communications device, the second message on the frequency-based resource unit based on receiving the first message.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 13:
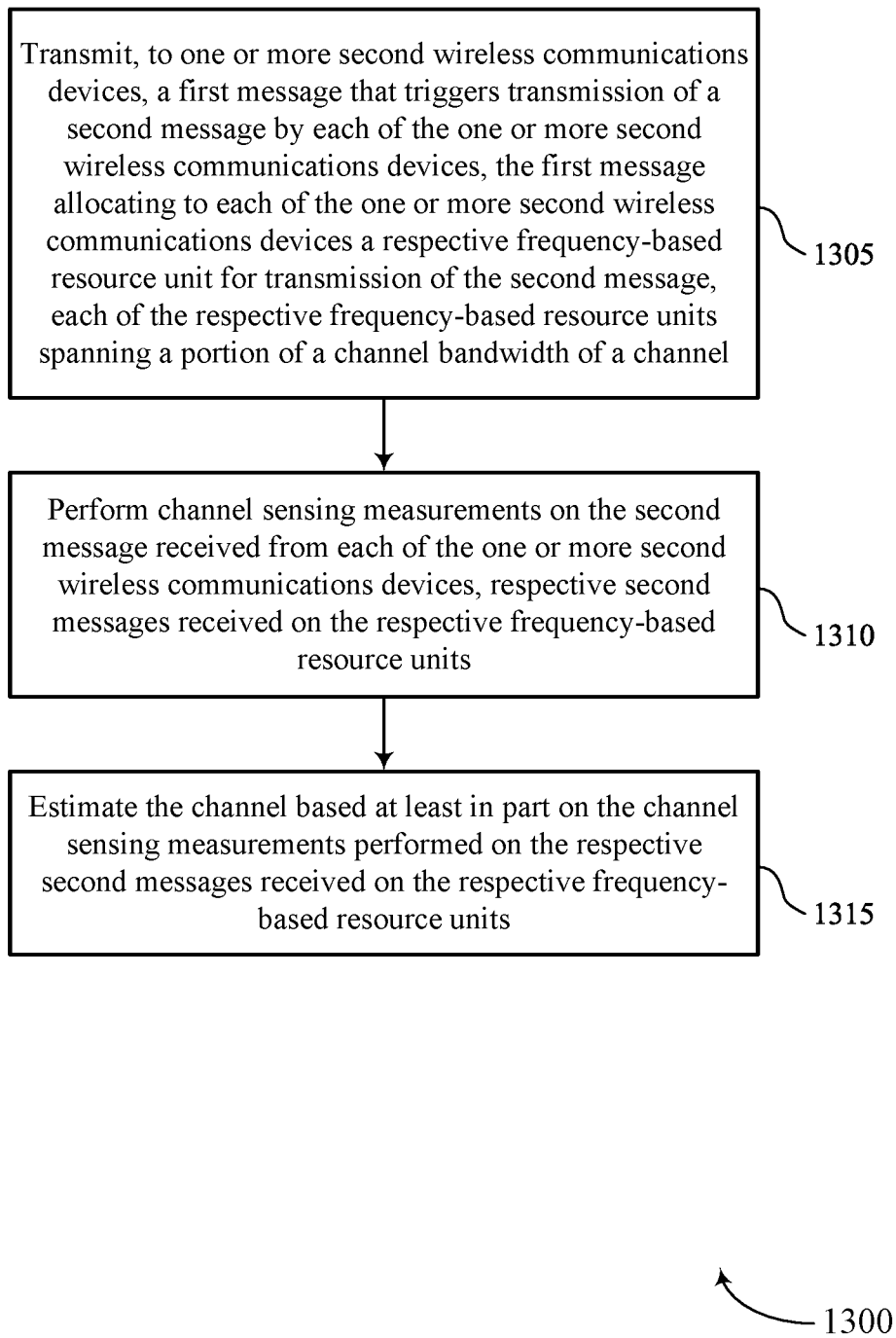
FIGS. 13 through 17 show flowcharts illustrating methods that support uplink multiple access sounding sequences in accordance with one or more aspects of the present disclosure.

FIG. 13 shows a flowchart illustrating a method 1300 that supports uplink multiple access sounding sequences in accordance with one or more aspects of the present disclosure. The operations of the method 1300 may be implemented by an AP or its components as described herein. For example, the operations of the method 1300 may be performed by an AP as described with reference to FIGS. 1 through 8. In some examples, an AP may execute a set of instructions to control the functional elements of the AP to perform the described functions. Additionally, or alternatively, the AP may perform aspects of the described functions using special-purpose hardware.

At 1305, the method may include transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The operations of 1305 may be performed in accordance with examples as disclosed herein. In some examples, aspects of the operations of 1305 may be performed by a trigger message transmission component 725 as described with reference to FIG. 7.

At 1310, the method may include performing channel sensing measurements on the second message received from each of the one or more second wireless communications devices, respective second messages received on the respective frequency-based resource units. The operations of 1310 may be performed in accordance with examples as disclosed herein. In some examples, aspects of the operations of 1310 may be performed by a channel sensing component 730 as described with reference to FIG. 7.

At 1315, the method may include estimating the channel based on the channel sensing measurements performed on the respective second messages received on the respective frequency-based resource units. The operations of 1315 may be performed in accordance with examples as disclosed herein. In some examples, aspects of the operations of 1315 may be performed by a channel estimation component 735 as described with reference to FIG. 7.

Figure 14:
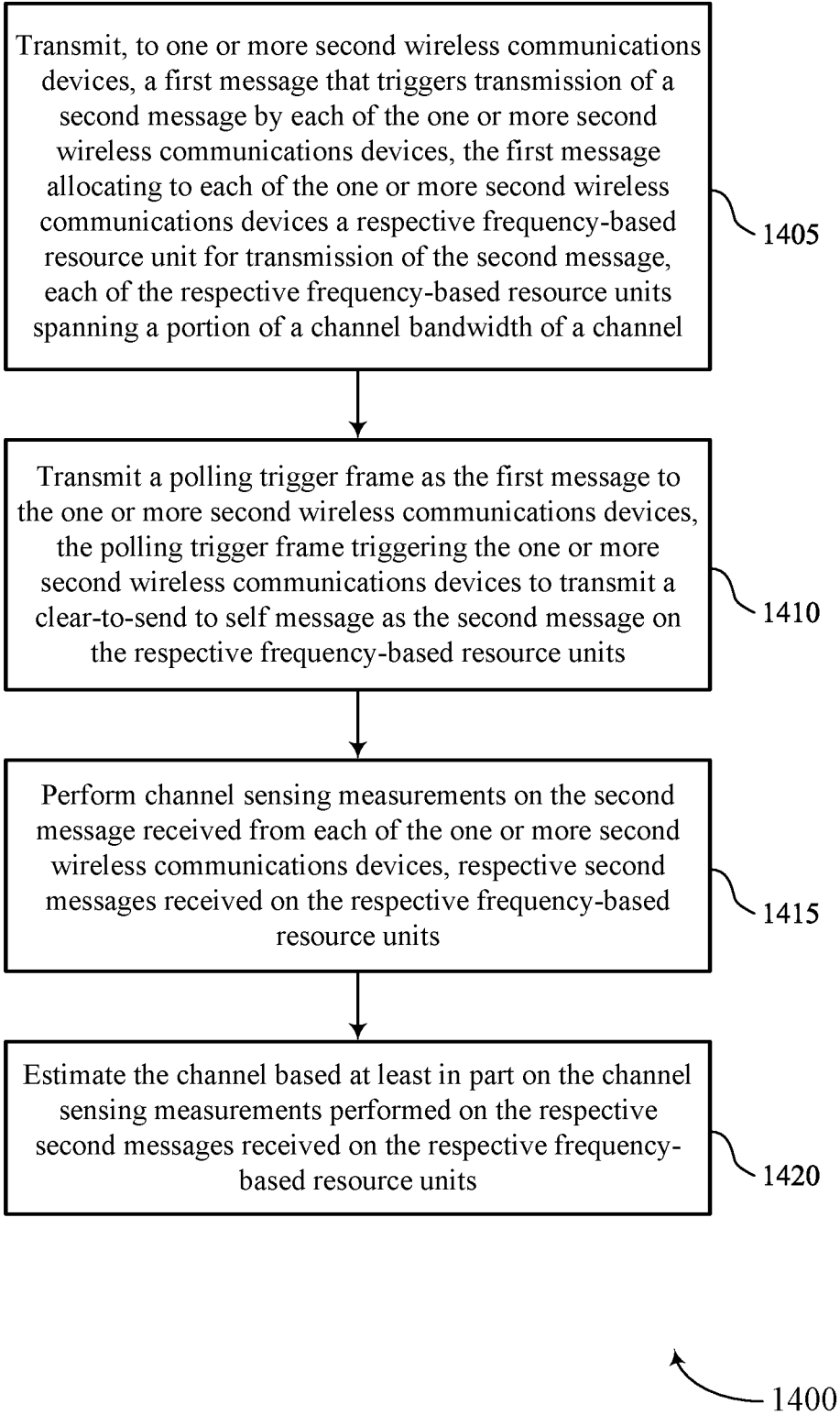

FIG. 14 shows a flowchart illustrating a method 1400 that supports uplink multiple access sounding sequences in accordance with one or more aspects of the present disclosure. The operations of the method 1400 may be implemented by an AP or its components as described herein. For example, the operations of the method 1400 may be performed by an AP as described with reference to FIGS. 1 through 8. In some examples, an AP may execute a set of instructions to control the functional elements of the AP to perform the described functions. Additionally, or alternatively, the AP may perform aspects of the described functions using special-purpose hardware.

At 1405, the method may include transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The operations of 1405 may be performed in accordance with examples as disclosed herein. In some examples, aspects of the operations of 1405 may be performed by a trigger message transmission component 725 as described with reference to FIG. 7.

At 1410, the method may include transmitting a polling trigger frame as the first message to the one or more second wireless communications devices, the polling trigger frame triggering the one or more second wireless communications devices to transmit a clear-to-send to self message as the second message on the respective frequency-based resource units. The operations of 1410 may be performed in accordance with examples as disclosed herein. In some examples, aspects of the operations of 1410 may be performed by a polling component 740 as described with reference to FIG. 7.

At 1415, the method may include performing channel sensing measurements on the second message received from each of the one or more second wireless communications devices, respective second messages received on the respective frequency-based resource units. The operations of 1415 may be performed in accordance with examples as disclosed herein. In some examples, aspects of the operations of 1415 may be performed by a channel sensing component 730 as described with reference to FIG. 7.

At 1420, the method may include estimating the channel based on the channel sensing measurements performed on the respective second messages received on the respective frequency-based resource units. The operations of 1420 may be performed in accordance with examples as disclosed herein. In some examples, aspects of the operations of 1420 may be performed by a channel estimation component 735 as described with reference to FIG. 7.

Figure 15:
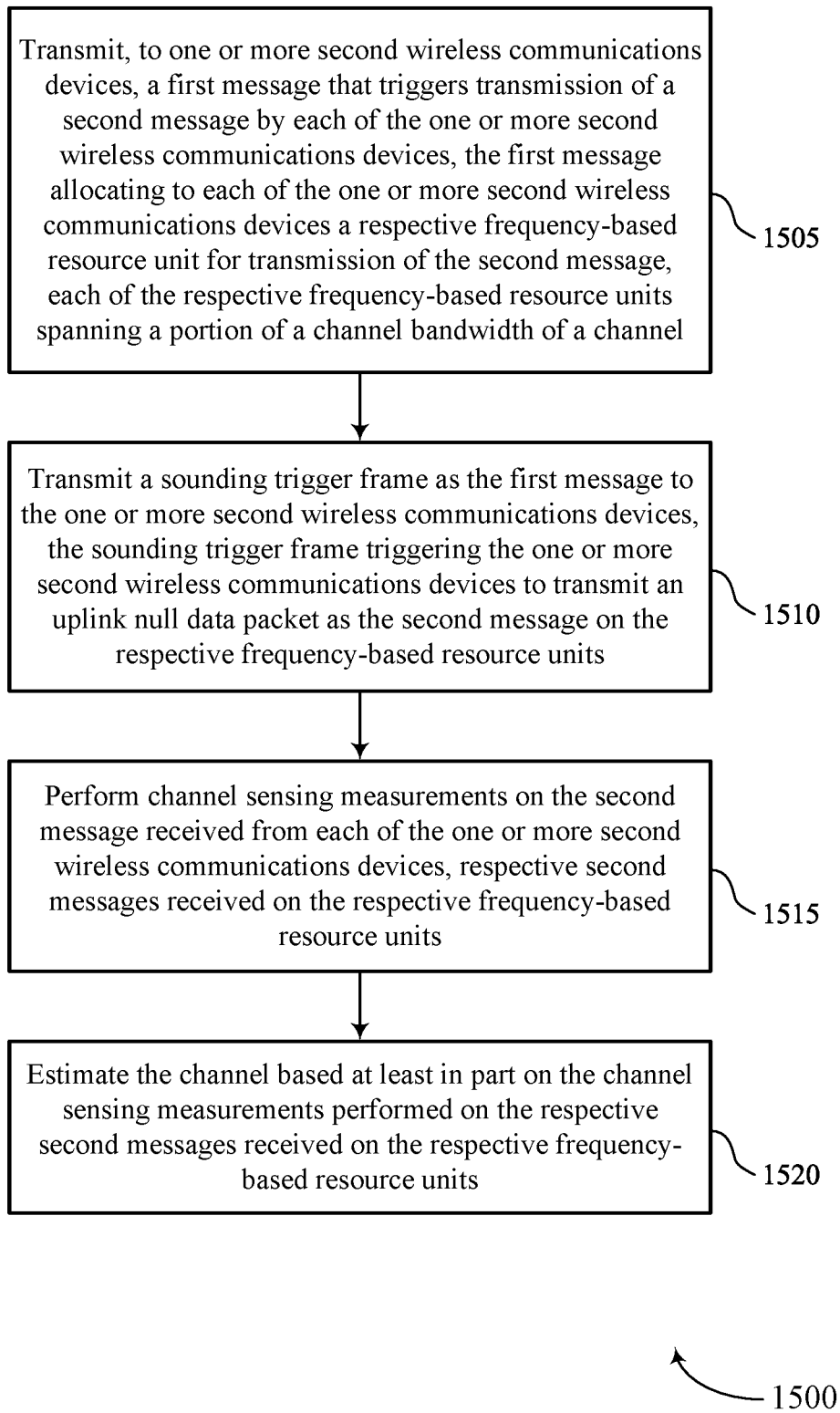

FIG. 15 shows a flowchart illustrating a method 1500 that supports uplink multiple access sounding sequences in accordance with one or more aspects of the present disclosure. The operations of the method 1500 may be implemented by an AP or its components as described herein. For example, the operations of the method 1500 may be performed by an AP as described with reference to FIGS. 1 through 8. In some examples, an AP may execute a set of instructions to control the functional elements of the AP to perform the described functions. Additionally, or alternatively, the AP may perform aspects of the described functions using special-purpose hardware.

At 1505, the method may include transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The operations of 1505 may be performed in accordance with examples as disclosed herein. In some examples, aspects of the operations of 1505 may be performed by a trigger message transmission component 725 as described with reference to FIG. 7.

At 1510, the method may include transmitting a sounding trigger frame as the first message to the one or more second wireless communications devices, the sounding trigger frame triggering the one or more second wireless communications devices to transmit an uplink null data packet as the second message on the respective frequency-based resource units. The operations of 1510 may be performed in accordance with examples as disclosed herein. In some examples, aspects of the operations of 1510 may be performed by a sounding component 745 as described with reference to FIG. 7.

At 1515, the method may include performing channel sensing measurements on the second message received from each of the one or more second wireless communications devices, respective second messages received on the respective frequency-based resource units. The operations of 1515 may be performed in accordance with examples as disclosed herein. In some examples, aspects of the operations of 1515 may be performed by a channel sensing component 730 as described with reference to FIG. 7.

At 1520, the method may include estimating the channel based on the channel sensing measurements performed on the respective second messages received on the respective frequency-based resource units. The operations of 1520 may be performed in accordance with examples as disclosed herein. In some examples, aspects of the operations of 1520 may be performed by a channel estimation component 735 as described with reference to FIG. 7.

Figure 16:
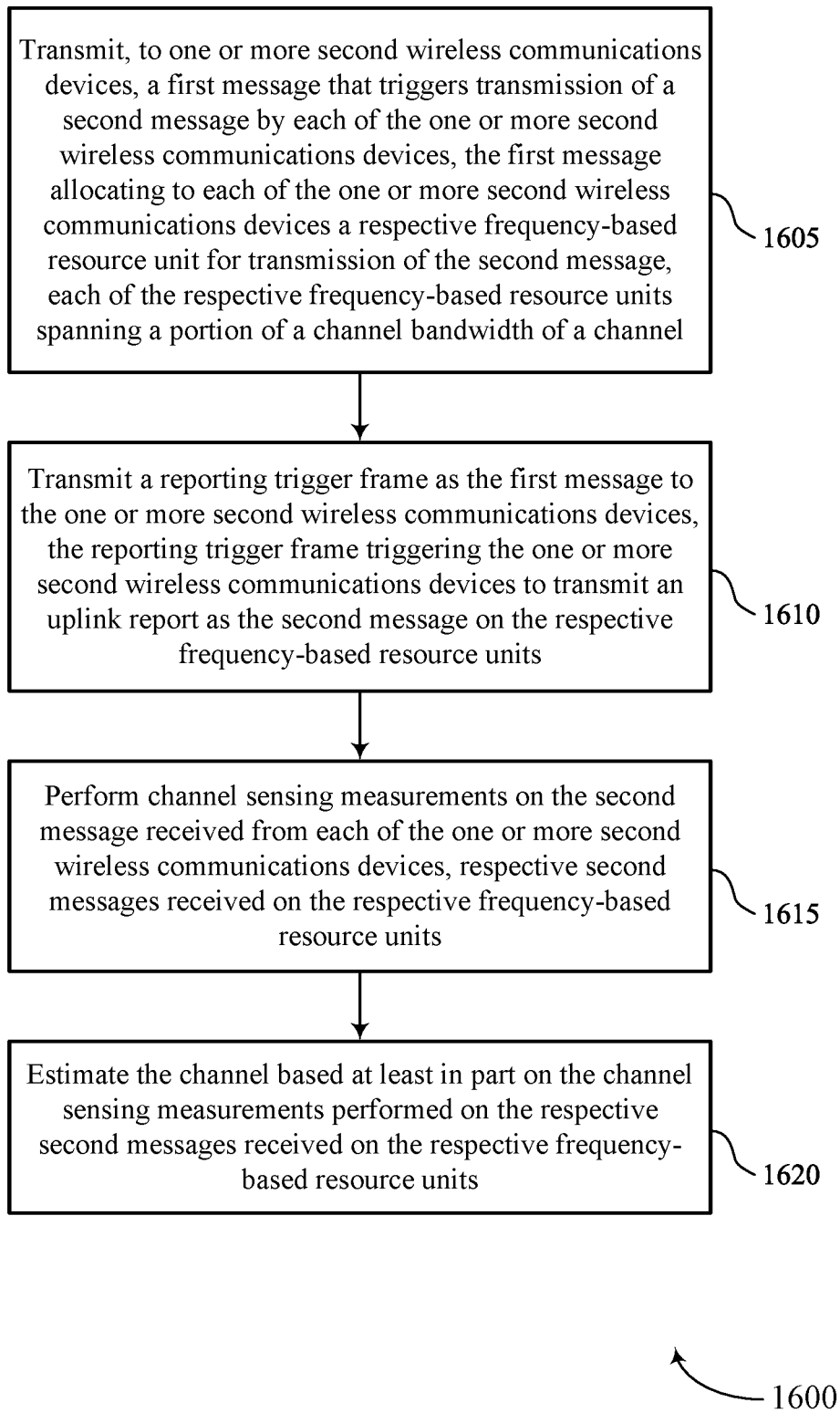

FIG. 16 shows a flowchart illustrating a method 1600 that supports uplink multiple access sounding sequences in accordance with one or more aspects of the present disclosure. The operations of the method 1600 may be implemented by an AP or its components as described herein. For example, the operations of the method 1600 may be performed by an AP as described with reference to FIGS. 1 through 8. In some examples, an AP may execute a set of instructions to control the functional elements of the AP to perform the described functions. Additionally, or alternatively, the AP may perform aspects of the described functions using special-purpose hardware.

At 1605, the method may include transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel. The operations of 1605 may be performed in accordance with examples as disclosed herein. In some examples, aspects of the operations of 1605 may be performed by a trigger message transmission component 725 as described with reference to FIG. 7.

At 1610, the method may include transmitting a reporting trigger frame as the first message to the one or more second wireless communications devices, the reporting trigger frame triggering the one or more second wireless communications devices to transmit an uplink report as the second message on the respective frequency-based resource units. The operations of 1610 may be performed in accordance with examples as disclosed herein. In some examples, aspects of the operations of 1610 may be performed by a reporting component 750 as described with reference to FIG. 7.

At 1615, the method may include performing channel sensing measurements on the second message received from each of the one or more second wireless communications devices, respective second messages received on the respective frequency-based resource units. The operations of 1615 may be performed in accordance with examples as disclosed herein. In some examples, aspects of the operations of 1615 may be performed by a channel sensing component 730 as described with reference to FIG. 7.

At 1620, the method may include estimating the channel based on the channel sensing measurements performed on the respective second messages received on the respective frequency-based resource units. The operations of 1620 may be performed in accordance with examples as disclosed herein. In some examples, aspects of the operations of 1620 may be performed by a channel estimation component 735 as described with reference to FIG. 7.

Figure 17:
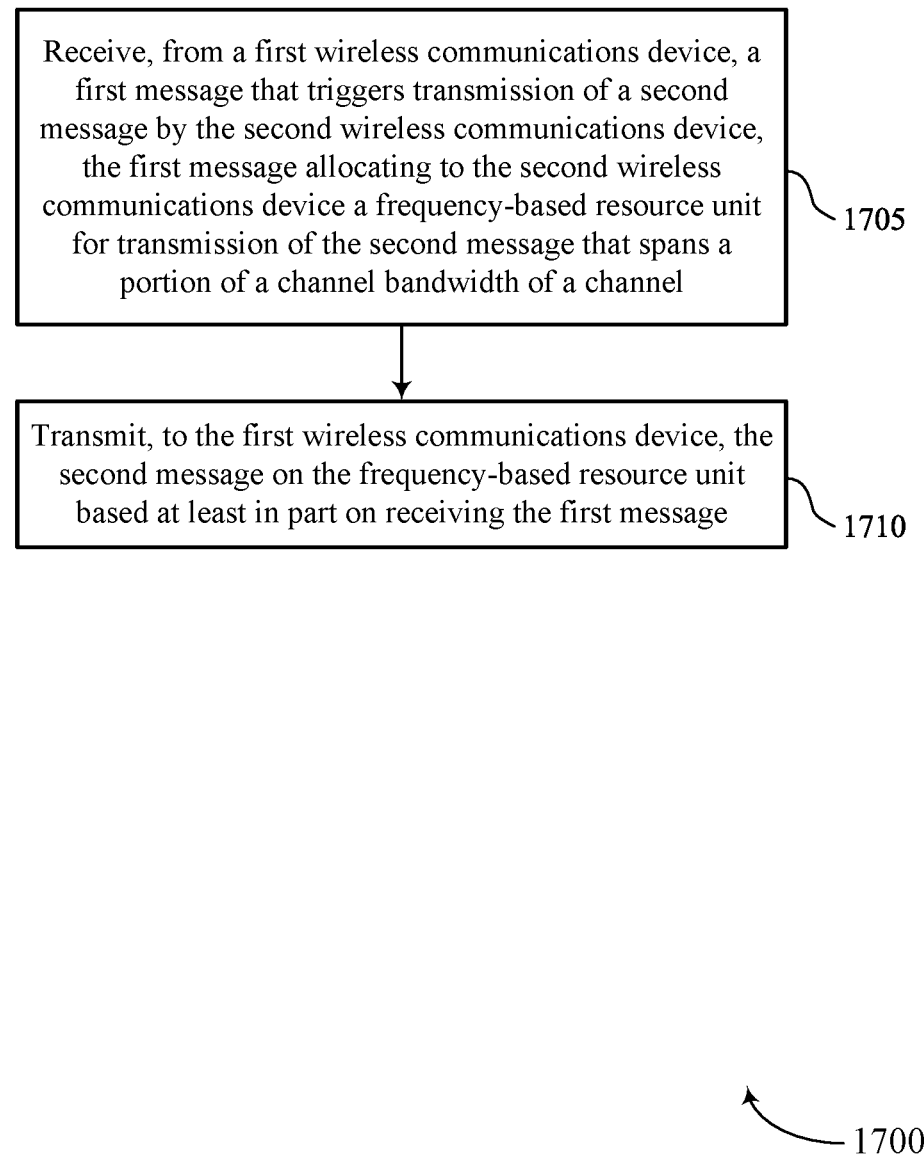

FIG. 17 shows a flowchart illustrating a method 1700 that supports uplink multiple access sounding sequences in accordance with one or more aspects of the present disclosure. The operations of the method 1700 may be implemented by an STA or its components as described herein. For example, the operations of the method 1700 may be performed by an STA as described with reference to FIGS. 1 through 4 and 9 through 12. In some examples, an STA may execute a set of instructions to control the functional elements of the STA to perform the described functions. Additionally, or alternatively, the STA may perform aspects of the described functions using special-purpose hardware.

At 1705, the method may include receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel. The operations of 1705 may be performed in accordance with examples as disclosed herein. In some examples, aspects of the operations of 1705 may be performed by a trigger message reception element 1125 as described with reference to FIG. 11.

At 1710, the method may include transmitting, to the first wireless communications device, the second message on the frequency-based resource unit based on receiving the first message. The operations of 1710 may be performed in accordance with examples as disclosed herein. In some examples, aspects of the operations of 1710 may be performed by a response message transmission element 1130 as described with reference to FIG. 11.

The following provides an overview of aspects of the present disclosure:

Aspect 1: A method for wireless communication at a first wireless communications device, comprising: transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel; performing channel sensing measurements on the second message received from each of the one or more second wireless communications devices, respective second messages received on the respective frequency-based resource units; and estimating the channel based at least in part on the channel sensing measurements performed on the respective second messages received on the respective frequency-based resource units.

Aspect 2: The method of aspect 1, wherein transmitting the first message further comprises: transmitting a polling trigger frame as the first message to the one or more second wireless communications devices, the polling trigger frame triggering the one or more second wireless communications devices to transmit a clear-to-send to self message as the second message on the respective frequency-based resource units.

Aspect 3: The method of any of aspects 1 through 2, wherein transmitting the first message further comprises: transmitting a sounding trigger frame as the first message to the one or more second wireless communications devices, the sounding trigger frame triggering the one or more second wireless communications devices to transmit an uplink null data packet as the second message on the respective frequency-based resource units.

Aspect 4: The method of any of aspects 1 through 3, wherein transmitting the first message further comprises: transmitting a reporting trigger frame as the first message to the one or more second wireless communications devices, the reporting trigger frame triggering the one or more second wireless communications devices to transmit an uplink report as the second message on the respective frequency-based resource units.

Aspect 5: The method of any of aspects 1 through 4, further comprising: performing the channel sensing measurements based at least in part on a preamble of the second message.

Aspect 6: The method of any of aspects 1 through 5, wherein performing the channel sensing measurements on the second message received from each of the one or more second wireless communications devices further comprises: performing the channel sensing measurements at least one of a preamble portion of the clear-to-send to self message on the respective frequency-based resource units, an uplink null data packet on the respective frequency-based resource units, or a preamble portion of an uplink report on the respective frequency-based resource units.

Aspect 7: The method of any of aspects 1 through 6, wherein transmitting the first message further comprises: transmitting multiple instances of the first message to different sets of the one or more second wireless communications devices during a single sounding sequence.

Aspect 8: The method of aspect 7, wherein transmitting the multiple instances of the first message to different sets of the one or more second wireless communications devices further comprises: transmitting a first sounding trigger frame to a first set of one or more second wireless communications devices and a second sounding trigger frame to a second set of the one or more second wireless communications devices, the first sounding trigger frame and the second sounding trigger frame triggering the one or more second wireless communications devices to transmit an uplink null data packet as the second message on the respective frequency-based resource units.

Aspect 9: The method of any of aspects 7 through 8, wherein transmitting the multiple instances of the first message to different sets of the one or more second wireless communications devices further comprises: transmitting a first polling trigger frame to at least a first set of one or more second wireless communications devices and a second polling trigger frame to a second set of the one or more second wireless communications devices, the first polling trigger frame and the second polling trigger frame triggering the one or more second wireless communications devices to transmit a clear-to-send to self message as the second message on the respective frequency-based resource units.

Aspect 10: The method of aspect 9, wherein the first polling trigger frame comprises a bit field with a value that indicates that the second set of the one or more second wireless communications devices are to respond to the second polling trigger frame.

Aspect 11: The method of any of aspects 7 through 10, wherein transmitting the multiple instances of the first message to different sets of the one or more second wireless communications devices further comprises: transmitting multiple instances of the first message; allocating, during transmission of a first instance of the first message, a first frequency-based resource unit for transmission of a first instance of the second message by one of the one or more second wireless communications devices; and allocating, during transmission of a second instance of the first message, a second frequency-based resource unit for transmission of a second instance of the second message by the one of the one or more second wireless communications devices.

Aspect 12: The method of any of aspects 1 through 11, wherein the first wireless communications device and the one or more second wireless communications devices operate in a wireless local area network.

Aspect 13: A method for wireless communication at a second wireless communications device, comprising: receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel; and transmitting, to the first wireless communications device, the second message on the frequency-based resource unit based at least in part on receiving the first message.

Aspect 14: The method of aspect 13, wherein receiving the first message further comprises: receiving a polling trigger frame as the first message from the first wireless communications device, the polling trigger frame triggering the second wireless communications device to transmit a clear-to-send to self message as the second message on the frequency-based resource unit; and transmitting the clear-to-send to self message as the second message on the frequency-based resource unit.

Aspect 15: The method of any of aspects 13 through 14, wherein receiving the first message further comprises: receiving a sounding trigger frame as the first message from the first wireless communications device, the sounding trigger frame triggering the second wireless communications device to transmit an uplink null data packet as the second message on the frequency-based resource unit; and transmitting the uplink null data packet as the second message on the frequency-based resource unit.

Aspect 16: The method of any of aspects 13 through 15, wherein receiving the first message further comprises: receiving a reporting trigger frame as the first message from the first wireless communications device, the reporting trigger frame triggering the second wireless communications device to transmit an uplink report as the second message on the frequency-based resource unit; and transmitting the uplink report as the second message on the frequency-based resource unit.

Aspect 17: The method of any of aspects 13 through 16, wherein channel sensing measurements are performed by the first wireless communications device based at least in part on a preamble of the second message.

Aspect 18: The method of any of aspects 13 through 17, further comprising: transmitting, to the first wireless communications device, at least one of a clear-to-send to self message on the frequency-based resource unit, an uplink null data packet on the frequency-based resource unit, or an uplink report on the frequency-based resource unit; wherein channel sensing measurements are performed on at least one of a preamble portion of the clear-to-send to self message, the uplink null data packet, or a preamble portion of the uplink report.

Aspect 19: The method of any of aspects 13 through 18, wherein receiving the first message further comprises: receiving at least a first instance of multiple instances of the first message transmitted to different sets of one or more second wireless communications devices during a single sounding sequence.

Aspect 20: The method of aspect 19, wherein receiving at least the first instance of the multiple instances of the first message transmitted to different sets of one or more second wireless communications devices during a single sounding sequence further comprises: receiving, from the first wireless communications device, a first sounding trigger frame transmitted to a first set of one or more second wireless communications devices, the first set comprising the second wireless communications device; wherein the first sounding trigger frame and a second sounding trigger frame transmitted to a second set of one or more second wireless communications devices trigger the one or more second wireless communications devices to transmit an uplink null data packet as the second message on respective frequency-based resource units.

Aspect 21: The method of any of aspects 19 through 20, wherein receiving at least the first instance of the multiple instances of the first message transmitted to different sets of one or more second wireless communications devices during a single sounding sequence further comprises: receiving, from the first wireless communications device, a first polling trigger frame transmitted to at least a first set of one or more second wireless communications devices, the first set comprising the second wireless communications device; wherein the first polling trigger frame and a second polling trigger frame transmitted to a second set of the one or more second wireless communications devices trigger the one or more second wireless communications devices to transmit a clear-to-send to self message as the second message on respective frequency-based resource units.

Aspect 22: The method of aspect 21, wherein the first polling trigger frame comprises a bit field with a value that indicates that the second set of the one or more second wireless communications devices are to respond to the second polling trigger frame.

Aspect 23: The method of any of aspects 19 through 22, wherein receiving at least the first instance of the multiple instances of the first message transmitted to different sets of one or more second wireless communications devices during a single sounding sequence further comprises: receiving the first instance of the multiple instances of the first message and a second instance of the multiple instances of the first message; receiving, during reception of the first instance, an allocation of a first frequency-based resource unit for transmission of a first instance of the second message by the second wireless communications device; and receiving, during reception of the second instance, an allocation of a second frequency-based resource unit for transmission of a second instance of the second message by the second wireless communications device.

Aspect 24: The method of any of aspects 13 through 23, wherein the first wireless communications device and the one or more second wireless communications devices operate in a wireless local area network.

Aspect 25: An apparatus for wireless communication at a first wireless communications device, comprising a processor; memory coupled with the processor; and instructions stored in the memory and executable by the processor to cause the apparatus to perform a method of any of aspects 1 through 12.

Aspect 26: An apparatus for wireless communication at a first wireless communications device, comprising at least one means for performing a method of any of aspects 1 through 12.

Aspect 27: A non-transitory computer-readable medium storing code for wireless communication at a first wireless communications device, the code comprising instructions executable by a processor to perform a method of any of aspects 1 through 12.

Aspect 28: An apparatus for wireless communication at a second wireless communications device, comprising a processor; memory coupled with the processor; and instructions stored in the memory and executable by the processor to cause the apparatus to perform a method of any of aspects 13 through 24.

Aspect 29: An apparatus for wireless communication at a second wireless communications device, comprising at least one means for performing a method of any of aspects 13 through 24.

Aspect 30: A non-transitory computer-readable medium storing code for wireless communication at a second wireless communications device, the code comprising instructions executable by a processor to perform a method of any of aspects 13 through 24.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless communications device, comprising:
    transmitting, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel, wherein the first message is a polling trigger frame that triggers the one or more second wireless communications devices to transmit a clear-to-send to self message as the second message on the respective frequency-based resource units;
    performing channel sensing measurements on the second message received from each of the one or more second wireless communications devices, respective second messages received on the respective frequency-based resource units; and
    estimating the channel based at least in part on the channel sensing measurements performed on the respective second messages received on the respective frequency-based resource units.

2. The method of claim 1, wherein transmitting the first message further comprises:
    transmitting a sounding trigger frame as the first message to the one or more second wireless communications devices, the sounding trigger frame triggering the one or more second wireless communications devices to transmit an uplink null data packet as the second message on the respective frequency-based resource units.

3. The method of claim 1, wherein transmitting the first message further comprises:

transmitting a reporting trigger frame as the first message to the one or more second wireless communications devices, the reporting trigger frame triggering the one or more second wireless communications devices to transmit an uplink report as the second message on the respective frequency-based resource units.

4. The method of claim 1, further comprising:
performing the channel sensing measurements based at least in part on a preamble of the second message.

5. The method of claim 1, wherein performing the channel sensing measurements on the second message received from each of the one or more second wireless communications devices further comprises:
performing the channel sensing measurements at least one of a preamble portion of the clear-to-send to self message on the respective frequency-based resource units, an uplink null data packet on the respective frequency-based resource units, or a preamble portion of an uplink report on the respective frequency-based resource units.

6. The method of claim 1, wherein transmitting the first message further comprises:
transmitting multiple instances of the first message to different sets of the one or more second wireless communications devices during a single sounding sequence.

7. The method of claim 6, wherein transmitting the multiple instances of the first message to different sets of the one or more second wireless communications devices further comprises:
transmitting a first sounding trigger frame to a first set of one or more second wireless communications devices and a second sounding trigger frame to a second set of the one or more second wireless communications devices, the first sounding trigger frame and the second sounding trigger frame triggering the one or more second wireless communications devices to transmit an uplink null data packet as the second message on the respective frequency-based resource units.

8. The method of claim 6, wherein transmitting the multiple instances of the first message to different sets of the one or more second wireless communications devices further comprises:
transmitting a first polling trigger frame to at least a first set of one or more second wireless communications devices and a second polling trigger frame to a second set of the one or more second wireless communications devices, the first polling trigger frame and the second polling trigger frame triggering the one or more second wireless communications devices to transmit respective clear-to-send to self messages as the second message on the respective frequency-based resource units.

9. The method of claim 8, wherein the first polling trigger frame comprises a bit field with a value that indicates that the second set of the one or more second wireless communications devices are to respond to the second polling trigger frame.

10. The method of claim 6, wherein transmitting the multiple instances of the first message to different sets of the one or more second wireless communications devices further comprises:
transmitting multiple instances of the first message;
allocating, during transmission of a first instance of the first message, a first frequency-based resource unit for transmission of a first instance of the second message by one of the one or more second wireless communications devices; and
allocating, during transmission of a second instance of the first message, a second frequency-based resource unit for transmission of a second instance of the second message by the one of the one or more second wireless communications devices.

11. The method of claim 1, wherein the first wireless communications device and the one or more second wireless communications devices operate in a wireless local area network.

12. A method for wireless communication at a second wireless communications device, comprising:
receiving, from a first wireless communications device, a first message that triggers transmission of a second message by the second wireless communications device, the first message allocating to the second wireless communications device a frequency-based resource unit for transmission of the second message that spans a portion of a channel bandwidth of a channel, wherein the first message is a polling trigger frame that triggers the second wireless communications device to transmit a clear-to-send to self message as the second message on the frequency-based resource unit; and
transmitting, to the first wireless communications device, the second message on the frequency-based resource unit based at least in part on receiving the first message.

13. The method of claim 12, wherein receiving the first message further comprises:
receiving a sounding trigger frame as the first message from the first wireless communications device, the sounding trigger frame triggering the second wireless communications device to transmit an uplink null data packet as the second message on the frequency-based resource unit; and
transmitting the uplink null data packet as the second message on the frequency-based resource unit.

14. The method of claim 12, wherein receiving the first message further comprises:
receiving a reporting trigger frame as the first message from the first wireless communications device, the reporting trigger frame triggering the second wireless communications device to transmit an uplink report as the second message on the frequency-based resource unit; and
transmitting the uplink report as the second message on the frequency-based resource unit.

15. The method of claim 12, wherein channel sensing measurements are performed by the first wireless communications device based at least in part on a preamble of the second message.

16. The method of claim 12, further comprising:
transmitting, to the first wireless communications device, at least one of a clear-to-send to self message on the frequency-based resource unit, an uplink null data packet on the frequency-based resource unit, or an uplink report on the frequency-based resource unit;
wherein channel sensing measurements are performed on at least one of a preamble portion of the clear-to-send to self message, the uplink null data packet, or a preamble portion of the uplink report.

17. The method of claim 12, wherein receiving the first message further comprises:
receiving at least a first instance of multiple instances of the first message transmitted to different sets of one or more second wireless communications devices during a single sounding sequence.

18. The method of claim 17, wherein receiving at least the first instance of the multiple instances of the first message transmitted to different sets of one or more second wireless communications devices during a single sounding sequence further comprises:
receiving, from the first wireless communications device, a first sounding trigger frame transmitted to a first set of one or more second wireless communications devices, the first set comprising the second wireless communications device;
wherein the first sounding trigger frame and a second sounding trigger frame transmitted to a second set of one or more second wireless communications devices trigger the one or more second wireless communications devices to transmit an uplink null data packet as the second message on respective frequency-based resource units.

19. The method of claim 17, wherein receiving at least the first instance of the multiple instances of the first message transmitted to different sets of one or more second wireless communications devices during a single sounding sequence further comprises:
receiving, from the first wireless communications device, a first polling trigger frame transmitted to at least a first set of one or more second wireless communications devices, the first set comprising the second wireless communications device;
wherein the first polling trigger frame and a second polling trigger frame transmitted to a second set of the one or more second wireless communications devices trigger the one or more second wireless communications devices to transmit respective clear-to-send to self messages as the second message on respective frequency-based resource units.

20. The method of claim 19, wherein the first polling trigger frame comprises a bit field with a value that indicates that the second set of the one or more second wireless communications devices are to respond to the second polling trigger frame.

21. The method of claim 17, wherein receiving at least the first instance of the multiple instances of the first message transmitted to different sets of one or more second wireless communications devices during a single sounding sequence further comprises:
receiving the first instance of the multiple instances of the first message and a second instance of the multiple instances of the first message;
receiving, during reception of the first instance, an allocation of a first frequency-based resource unit for transmission of a first instance of the second message by the second wireless communications device; and
receiving, during reception of the second instance, an allocation of a second frequency-based resource unit for transmission of a second instance of the second message by the second wireless communications device.

22. The method of claim 12, wherein the first wireless communications device and the second wireless communications device operate in a wireless local area network.

23. An apparatus for wireless communication at a first wireless communications device, comprising:
a processor;
memory coupled with the processor; and
instructions stored in the memory and executable by the processor to cause the apparatus to:
transmit, to one or more second wireless communications devices, a first message that triggers transmission of a second message by each of the one or more second wireless communications devices, the first message allocating to each of the one or more second wireless communications devices a respective frequency-based resource unit for transmission of the second message, each of the respective frequency-based resource units spanning a portion of a channel bandwidth of a channel, wherein the first message is a polling trigger frame that triggers the one or more second wireless communications devices to transmit a clear-to-send to self message as the second message on the respective frequency-based resource units;
perform channel sensing measurements on the second message received from each of the one or more second wireless communications devices, respective second messages received on the respective frequency-based resource units; and
estimate the channel based at least in part on the channel sensing measurements performed on the respective second messages received on the respective frequency-based resource units.

24. The apparatus of claim 23, wherein the instructions to transmit the first message are further executable by the processor to cause the apparatus to:
transmit a sounding trigger frame as the first message to the one or more second wireless communications devices, the sounding trigger frame triggering the one or more second wireless communications devices to transmit an uplink null data packet as the second message on the respective frequency-based resource units.

25. The apparatus of claim 23, wherein the instructions to transmit the first message are further executable by the processor to cause the apparatus to:
transmit a reporting trigger frame as the first message to the one or more second wireless communications devices, the reporting trigger frame triggering the one or more second wireless communications devices to transmit an uplink report as the second message on the respective frequency-based resource units.

26. An apparatus for wireless communication at a second wireless communications device, comprising:
a processor;
memory coupled with the processor; and
instructions stored in the memory and executable by the processor to cause the apparatus to:
receive, from a first wireless communications device, a first message that triggers transmission of a second message by the second wireless communications device, the first message allocating to the second wireless communications device a frequency-based resource unit for transmission of the second message that spans a portion of a channel bandwidth of a channel, wherein the first message is a polling trigger frame that triggers the second wireless communications device to transmit a clear-to-send to self message as the second message on the frequency-based resource unit; and
transmit, to the first wireless communications device, the second message on the frequency-based resource unit based at least in part on receiving the first message.

27. The apparatus of claim 26, wherein the instructions to receive the first message are further executable by the processor to cause the apparatus to:

receive at least a first instance of multiple instances of the first message transmitted to different sets of one or more second wireless communications devices during a single sounding sequence.

\* \* \* \* \*